United States Patent
AlBahrani et al.

(10) Patent No.: US 10,982,124 B2
(45) Date of Patent: Apr. 20, 2021

(54) DRILL-IN FLUID COMPOSITIONS AND METHODS

(71) Applicant: Saudi Arabian Oil Company, Dhahran (SA)

(72) Inventors: Hussain AlBahrani, Qatif (SA); Abdullah Saleh Hussain Al-Yami, Dhahran (SA); Abdulla Hussein Al-Awadh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 152 days.

(21) Appl. No.: 15/804,763

(22) Filed: Nov. 6, 2017

(65) Prior Publication Data
US 2019/0136110 A1    May 9, 2019

(51) Int. Cl.
| | | |
|---|---|---|
| C09K 8/12 | (2006.01) |
| C09K 8/575 | (2006.01) |
| C09K 8/57 | (2006.01) |
| C09K 8/506 | (2006.01) |
| C09K 8/504 | (2006.01) |
| C09K 8/04 | (2006.01) |
| C09K 8/08 | (2006.01) |
| E21B 21/00 | (2006.01) |

(52) U.S. Cl.
CPC .............. *C09K 8/12* (2013.01); *C09K 8/04* (2013.01); *C09K 8/08* (2013.01); *C09K 8/506* (2013.01); *C09K 8/5045* (2013.01); *C09K 8/572* (2013.01); *C09K 8/575* (2013.01); *E21B 21/00* (2013.01); *C09K 2208/12* (2013.01); *C09K 2208/18* (2013.01)

(58) Field of Classification Search
None
See application file for complete search history.

(56) References Cited

U.S. PATENT DOCUMENTS

| | | | | |
|---|---|---|---|---|
| 2,848,469 A | * | 8/1958 | Kroll | E21B 37/06 562/564 |
| 3,200,106 A | * | 8/1965 | Dickson | D06M 13/332 530/231 |
| 3,750,768 A | | 8/1973 | Suman, Jr. et al. | |

(Continued)

FOREIGN PATENT DOCUMENTS

| | | |
|---|---|---|
| EP | 326720 | 8/1989 |
| WO | 2011083182 | 7/2011 |
| WO | 2013189842 | 12/2013 |

OTHER PUBLICATIONS

International Search Report and Written Opinion issued in International Application No. PCT/US2018/058464 dated Feb. 4, 2019, 16 pages.

(Continued)

*Primary Examiner* — John J Figueroa
(74) *Attorney, Agent, or Firm* — Fish & Richardson P.C.

(57) ABSTRACT

The present application provides a drill-in slurry containing an aqueous base fluid; a solid particulate material; a hygroscopic chelating agent; optionally an alkali formate; and optionally an additional ingredient such as a defoamer, a viscosity modifier, a stabilizer, soda ash or sodium bicarbonate. Methods for making the drill-in slurry and methods of using the drill-in slurry for drilling into a reservoir section or a producing section of a subterranean formation are also provided.

19 Claims, 2 Drawing Sheets

(56) References Cited

U.S. PATENT DOCUMENTS

| | | | |
|---|---|---|---|
| 4,030,548 A | | 6/1977 | Richardson et al. |
| 4,081,030 A | * | 3/1978 | Carpenter ............ C09K 8/5086 |
| | | | 166/276 |
| 5,612,293 A | | 3/1997 | Swartwout et al. |
| 6,180,571 B1 | | 1/2001 | Sifferman et al. |
| 8,962,535 B2 | | 2/2015 | Welton et al. |
| 9,353,305 B1 | | 5/2016 | Jiang et al. |
| 2008/0070805 A1 | | 3/2008 | Munoz et al. |
| 2009/0084554 A1 | | 4/2009 | Williamson et al. |
| 2010/0071957 A1 | | 3/2010 | Huang et al. |
| 2011/0168395 A1 | | 7/2011 | Welton et al. |
| 2011/0312857 A1 | | 12/2011 | Amanullah et al. |
| 2013/0261032 A1 | * | 10/2013 | Ladva ................... C09K 8/00 |
| | | | 507/131 |
| 2014/0151042 A1 | | 6/2014 | Faugerstrom et al. |
| 2014/0190695 A1 | | 7/2014 | van Zanten et al. |
| 2014/0231146 A1 | | 8/2014 | Nguyen |
| 2015/0191640 A1 | | 7/2015 | Lee et al. |

OTHER PUBLICATIONS

GCC Examination Report in GCC Appln. No. GC 2018-36390, dated Mar. 26, 2020, 4 pages.

* cited by examiner

DRILL-IN FLUID COMPOSITIONS AND METHODS

TECHNICAL FIELD

This document relates to drill-in fluids containing a hygroscopic chelating agent.

BACKGROUND

Recoverable fluids, such as hydrocarbons (for example, petroleum or natural gas) and water, are frequently found in subterranean formations. Production of a recoverable fluid from a subterranean formation often requires drilling onto the subterranean formation to produce a wellbore through which the recoverable fluid is brought to the surface. Production of recoverable fluids from a producing formation has to be controlled until the well is completed and the necessary production equipment has been installed.

The most common way of controlling flow of a recoverable fluid during the drilling through the reservoir portion of the formation is circulation of a drill-in fluid in a wellbore. One purpose of the drill-in fluid is to create a hydrostatic pressure against the wellbore wall to prevent the flow of the recoverable fluid from the producing formation into the wellbore. The hydrostatic pressure of the drill-in fluid relative to the hydrostatic pressure of the recoverable fluid may be controlled by varying viscosity and density of the drill-in fluid. Typically, the drill-in fluid is a high-density slurry with a typical density range of about 70 to about 150 pounds per cubic foot ($lb/ft^3$), or 9 to 20 pounds per gallon (lb/gal) of fine, inorganic solids, such as clay and barite, in an aqueous liquid or a hydrocarbon liquid. When such a slurry is forced against a permeable formation under pressure, a liquid filtrate passes into the formation, leaving a mudcake on the wall of the wellbore. Deep filtrate invasion and loss of the formation permeability due to deposit of the mudcake on the wellbore wall may reduce production of the recoverable fluids and result in damage to the reservoir and the wellbore. Therefore, issues associated with the use of the drill-in slurries can reduce well productivity and increase well maintenance costs.

SUMMARY

The present application provides, inter alia, a reservoir drill-in slurry utilizing a hygroscopic chelating agent. The agent chelates solids that are present in the drill-in slurry described in this application remain in the slurry and do not deposit on the walls of a reservoir portion of a subterranean formation, for example, as part of a mudcake. As a result, due to the reduced thickness of the mudcake, pores of the formation remain permeable to recoverable fluids. Due to its hygroscopic properties, the chelating agent can also reduce the volume of the liquid filtrate invading the reservoir. This effect is achieved by the hygroscopic agent attracting water molecules that compose the majority of the liquid filtrate.

Using the hygroscopic chelating agent in the reservoir drill-in slurry retains the solids in the slurry. This leads to reduced thickness of a mudcake on the walls of the reservoir, when compared to the thickness of the mudcake in the reservoir when a conventional fluid lacking the hygroscopic chelating agent is used for reservoir drilling.

Furthermore, the hygroscopic nature of the agent decreases filtrate invasion of the reservoir by retaining inside the wellbore an aqueous medium that carries the solid particles. Overall, using a hygroscopic chelating agent in a drill-in slurry results in a lower skin factor in the reservoir and leads to increased reservoir production.

In a first general aspect, the present application provides a drill-in slurry including:

(a) an aqueous base fluid;

(b) a solid particulate material; and (c) a hygroscopic chelating agent in a range of about 0.5 weight percent (wt. %) to about 5 wt. %;

in which the chelating agent binds to at least one particle of the solid particulate material; and where the drill-in slurry is adapted for drilling through a reservoir section of a subterranean formation.

In a second general aspect, the present application provides a method of drilling into a reservoir section or a producing section of a subterranean formation, the method including:

(a) obtaining the drill-in slurry including:

i) an aqueous base fluid;

ii) a solid particulate material; and iii) a hygroscopic chelating agent that binds to at least one particle of the solid particulate material; and (b) introducing the drill-in slurry of step (a) to a wellbore that penetrates the reservoir section of the subterranean formation.

Implementations of the first and second general aspects may include one or more of the following features.

In some embodiments, the solid particulate material includes a metal salt, a metal oxide, or a metal hydroxide.

In some embodiments, the solid particulate material includes calcium carbonate.

In some embodiments, amount of solid particulate material in the drill-in slurry is from about 5 wt. % to about 25 wt. %.

In some embodiments, the hygroscopic chelating agent is a polyamine.

In some embodiments, the hygroscopic chelating agent includes at least one compound of Formula (I):

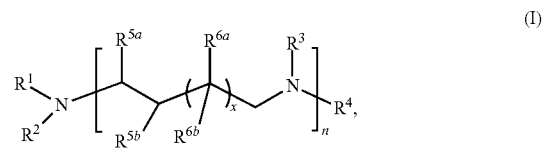

or a salt thereof, in which:

$R^1$, $R^2$ and $R^4$ are independently selected from the group consisting of H, $C_{1-6}$ alkyl, $C_{2-6}$ alkenyl, $C_{2-6}$ alkynyl, $Cy^1$, $C(O)R^b$, $C(O)NR^cR^d$, $C(O)OR^a$, $S(O)_2R^b$, $S(O)_2NR^cR^d$; where the $C_{1-6}$ alkyl, $C_{2-6}$ alkenyl and $C_{2-6}$ alkynyl are each optionally substituted with 1, 2, 3, or 4 substituents independently selected from the group consisting of halo, $Cy^2$, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{b1}$, $NR^{c1}C(O)NR^{c1}R^{d1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$;

each $R^3$, $R^{5a}$, $R^{5b}$, $R^{6a}$ and $R^{6b}$ is independently selected from the group consisting of H, $C_{1-6}$ alkyl, $C_{2-6}$ alkenyl, $C_{2-6}$ alkynyl, $Cy^1$, $C(O)R^b$, $C(O)NR^cR^d$, $C(O)OR^a$, $S(O)_2R^b$, $S(O)_2NR^cR^d$ and a group of formula (i):

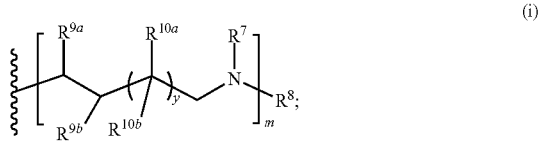

in which the $C_{1-6}$ alkyl, $C_{2-6}$ alkenyl and $C_{2-6}$ alkynyl are each optionally substituted with 1, 2, 3, or 4 substituents independently selected from the group consisting of halo, $Cy^2$, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{b1}$, $NR^{c1}C(O)NR^{c1}R^{d1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$;

or alternatively, when x is 1, 2, or 3, any two $R^3$ and $R^{5a}$ groups together with the carbon atom to which $R^{5a}$ is attached, the carbon atom to which $R^{6a}$ and $R^{6b}$ are attached and the nitrogen atom to which $R^3$ is attached form a 5-10 membered heterocycloalkyl, which is optionally substituted with 1, 2, or 3 independently selected $R^g$ substituents;

or alternatively, when n is an integer between 2 and 100, any two adjacent $R^3$ groups together with the nitrogen atoms to which they are attached, the carbon atom to which $R^{5a}$ and $R^{5b}$ are attached and the carbon atom to which $R^{6a}$ and $R^{6b}$ are attached form a 5-10 membered heterocycloalkyl, which is optionally substituted with 1, 2, or 3 independently selected $R^g$ substituents;

each $R^7$, $R^8$, $R^{9a}$, $R^{9b}$, $R^{10a}$ and $R^{10b}$ is independently selected from the group consisting of H, $C_{1-6}$ alkyl, $C_{2-6}$ alkenyl, $C_{2-6}$ alkynyl, $Cy^1$, $C(O)R^b$, $C(O)NR^cR^d$, $C(O)OR^a$, $S(O)_2R^b$, $S(O)_2NR^cR^d$; where the $C_{1-6}$ alkyl, $C_{2-6}$ alkenyl and $C_{2-6}$ alkynyl are each optionally substituted with 1, 2, 3, or 4 substituents independently selected from the group consisting of halo, $Cy^2$, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{b1}$, $NR^{c1}C(O)NR^{c1}R^{d1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$;

or, alternatively, when y is 1, 2, or 3, any two $R^7$ and $R^{9a}$ groups together with the carbon atom to which $R^{9a}$ is attached, the carbon atom to which $R^{10a}$ and $R^{10b}$ are attached and the nitrogen atom to which $R^7$ is attached form a 5-10 membered heterocycloalkyl, which is optionally substituted with 1, 2, or 3 independently selected $R^g$ substituents;

or, alternatively, when m is an integer between 2 and 100, any two adjacent $R^7$ groups together with the nitrogen atoms to which they are attached, the carbon atom to which $R^{9a}$ and $R^{9b}$ are attached and the carbon atom to which $R^{10a}$ and $R^{10b}$ are attached form a 5-10 membered heterocycloalkyl, which is optionally substituted with 1, 2, or 3 independently selected $R^g$ substituents;

each n and m is independently an integer between 1 and 100;

each x and y is independently an integer between 0 and 10;

each $Cy^1$ and $Cy^2$ is independently selected from the group consisting of $C_{3-7}$ cycloalkyl, 4-7 membered heterocycloalkyl, 6-12 membered aryl, and 5-14 membered heteroaryl, each of which is optionally substituted with 1, 2, 3, or 4 substituents independently selected from $R^{Cy}$;

each $R^{Cy}$ is independently selected from the group consisting of $C_{1-6}$ alkyl, $C_{2-6}$ alkenyl, $C_{2-6}$ alkynyl, halo, CN, $OR^{a2}$, $SR^{a2}$, $C(O)R^{b2}$, $C(O)NR^{c2}R^{d2}$, $C(O)OR^{a2}$, $OC(O)R^{b2}$, $OC(O)NR^{c2}R^{d2}$, $NR^{c2}R^{d2}$, $NR^{c2}C(O)R^{b2}$, $NR^{c2}C(O)OR^{a2}$, $NR^{c2}C(O)NR^{c2}R^{d2}$ $NR^{c2}S(O)R^{b2}$, $NR^{c2}S(O)_2R^{b2}$, $NR^{c2}S(O)_2NR^{c2}R^{d2}$, $S(O)_2R^{b2}$, and $S(O)_2NR^{c2}R^{d2}$; where the $C_{1-6}$ alkyl, $C_{2-6}$ alkenyl, and $C_{2-6}$ alkynyl are each optionally substituted with 1, 2, or 3 substituents independently selected from halo, CN, $OR^{a3}$, $SR^{a3}$, $C(O)R^{b3}$, $C(O)NR^{c3}R^{d3}$, $C(O)OR^{a3}$, $OC(O)R^{b3}$, $OC(O)NR^{c3}R^{d3}$, $NR^{c3}R^{d3}$, $NR^{c3}C(O)R^{b3}$, $NR^{c3}C(O)OR^{a3}$, $NR^{c3}C(O)NR^{c3}R^{d3}$, $NR^{c3}S(O)_2R^{b3}$, $NR^{c3}S(O)_2NR^{c3}R^{d3}$, $S(O)_2R^{b3}$, and $S(O)_2NR^{c3}R^{d3}$;

each $R^a$, $R^b$, $R^c$, $R^d$, $R^{a1}$, $R^{b1}$, $R^{c1}$, $R^{d1}$, $R^{a2}$, $R^{b2}$, $R^{c2}$, $R^{d2}$, $R^{a3}$, $R^{b3}$, $R^{c3}$, and $R^{d3}$ is independently selected from H, $C_{1-6}$ alkyl, $C_{2-6}$ alkenyl, $C_{2-6}$ alkynyl, $C_{3-7}$ cycloalkyl, 4-7 membered heterocycloalkyl, 6-12 membered aryl, and 5-14 membered heteroaryl; where each $C_{1-6}$ alkyl, $C_{2-6}$ alkenyl, $C_{2-6}$ alkynyl, $C_{3-7}$ cycloalkyl, 4-7 membered heterocycloalkyl, 6-12 membered aryl, and 5-14 membered heteroaryl is optionally substituted with 1, 2, or 3 independently selected substituents $R^g$;

or alternatively, any $R^c$ and $R^d$ attached to the same N atom, any $R^{c1}$ and $R^{d1}$ attached to the same N atom, any $R^{c2}$ and $R^{d2}$ attached to the same N atom, and any $R^{c3}$ and $R^{d3}$ attached to the same N atom, together with the with the N atom to which they are attached, form a 4-6 membered heterocycloalkyl group or a 5-6 membered heteroaryl group, each optionally substituted with 1, 2, or 3 independently selected $R^g$ groups;

each $R^g$ is independently selected from the group consisting of OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl) carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkyl aminosulfonylamino, di($C_{1-6}$ alkyl)aminosulfonylamino, aminocarbonylamino, $C_{1-6}$ alkyl aminocarbonylamino, and di($C_{1-6}$ alkyl)aminocarbonylamino.

In some embodiments, n is an integer between 1 and 20.

In some embodiments, each of $R^1$, $R^2$, $R^4$, $R^{5a}$, $R^{5b}$, $R^{6a}$ and $R^{6b}$ is independently selected from the group consisting of H and $C_{1-3}$ alkyl.

In some embodiments, n is an integer between 2 and 20, and at least at one occurrence any two adjacent $R^3$ groups together with the nitrogen atoms to which they are attached, the carbon atom to which $R^{5a}$ and $R^{5b}$ are attached and the carbon atom to which $R^{6a}$ and $R^{6b}$ are attached form a 5-10 membered heterocycloalkyl, which is optionally substituted with 1, 2, or 3 independently selected $R^g$ substituents.

In some embodiments, each $R^3$ is selected from the group consisting of H, $C_{1-6}$ alkyl and a moiety of formula (i):

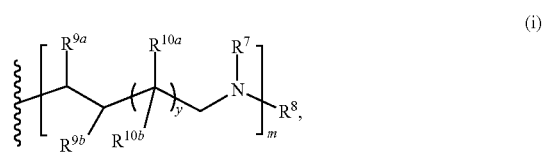

in which:

each $R^8$, $R^{9a}$, $R^{9b}$, $R^{10a}$ and $R^{10b}$ is independently selected from the group consisting of H and $C_{1-3}$ alkyl; and each $R^7$ is selected from the group consisting of H and $C_{1-6}$ alkyl; where the $C_{1-6}$ alkyl is optionally substituted with 1 or 2 amino groups.

In some embodiments, $R^3$ is selected from the group consisting of H, $CH_3$ and a moiety of formula (i-a):

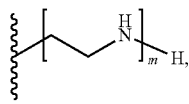

(i-a)

in which m is an integer between 1 and 5.

In some embodiments, the compound of Formula (I) is selected from the group consisting of:

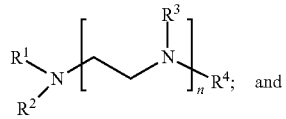

(Ia)

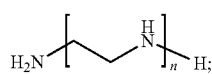

(Ib)

In some embodiments, the hygroscopic chelating agent is selected from the group consisting of:

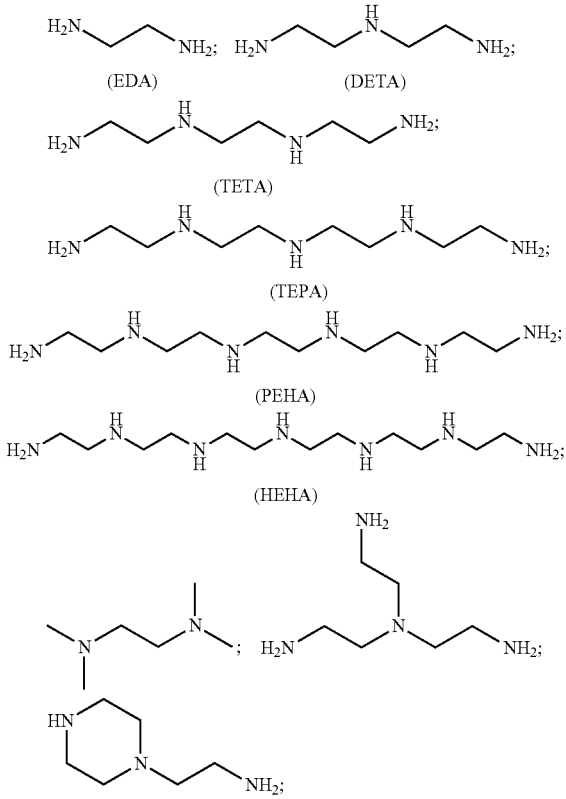

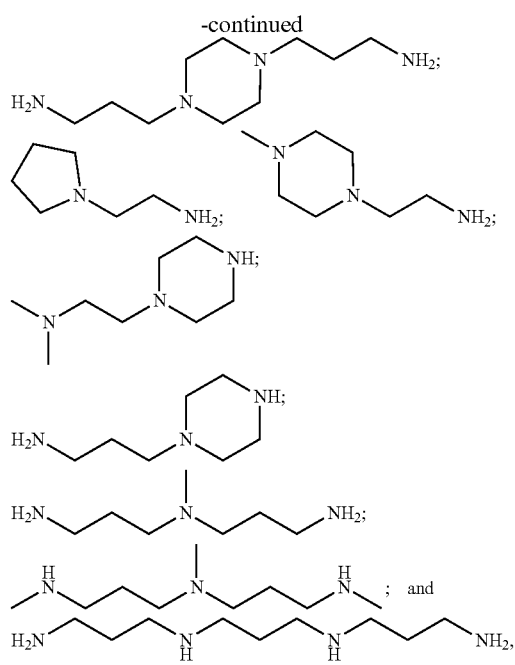

or a mixture thereof.

In some embodiments, an amount of the hygroscopic chelating agent in the drill-in slurry is in a range of about 1 wt. % to about 4 wt. %.

In some embodiments, the amount of the hygroscopic chelating agent in the drill-in slurry is in a range of about 1 wt. % to about 2 wt. %.

In some embodiments, the drill-in slurry contains at least one alkali formate.

In some embodiments, an amount of the at least one alkali formate in the drill-in slurry is from about 20 wt. % to about 60 wt. %.

In some embodiments, the drill-in slurry contains an additional ingredient selected from the group consisting of a defoamer, a viscosity modifier, a stabilizer, soda ash, sodium bicarbonate, or a combination thereof.

In some embodiments, a pH of the drill-in slurry is in the range of about 9 to about 11, a density of the drill-in slurry is in a range of about 50 pcf to about 150 pcf, and a plastic viscosity of the drill-in slurry is in a range of about 5 to about 50 cP.

Unless otherwise defined, all technical and scientific terms used in the present application have the same meaning as commonly understood by one of ordinary skill in the art to which the present application belongs. Methods and materials are described in the present application for use in the present application; however, other suitable methods and materials known in the art can also be used. The materials, methods, and examples are illustrative only and not intended to be limiting. All publications, patent applications, patents, sequences, database entries, and other references mentioned in the present application are incorporated by reference in their entirety. In case of conflict, the present specification, including definitions, will control.

Other features and advantages of the present application will be apparent from the following detailed description and figures, and from the claims.

DETAILED DESCRIPTION

Figure 1:
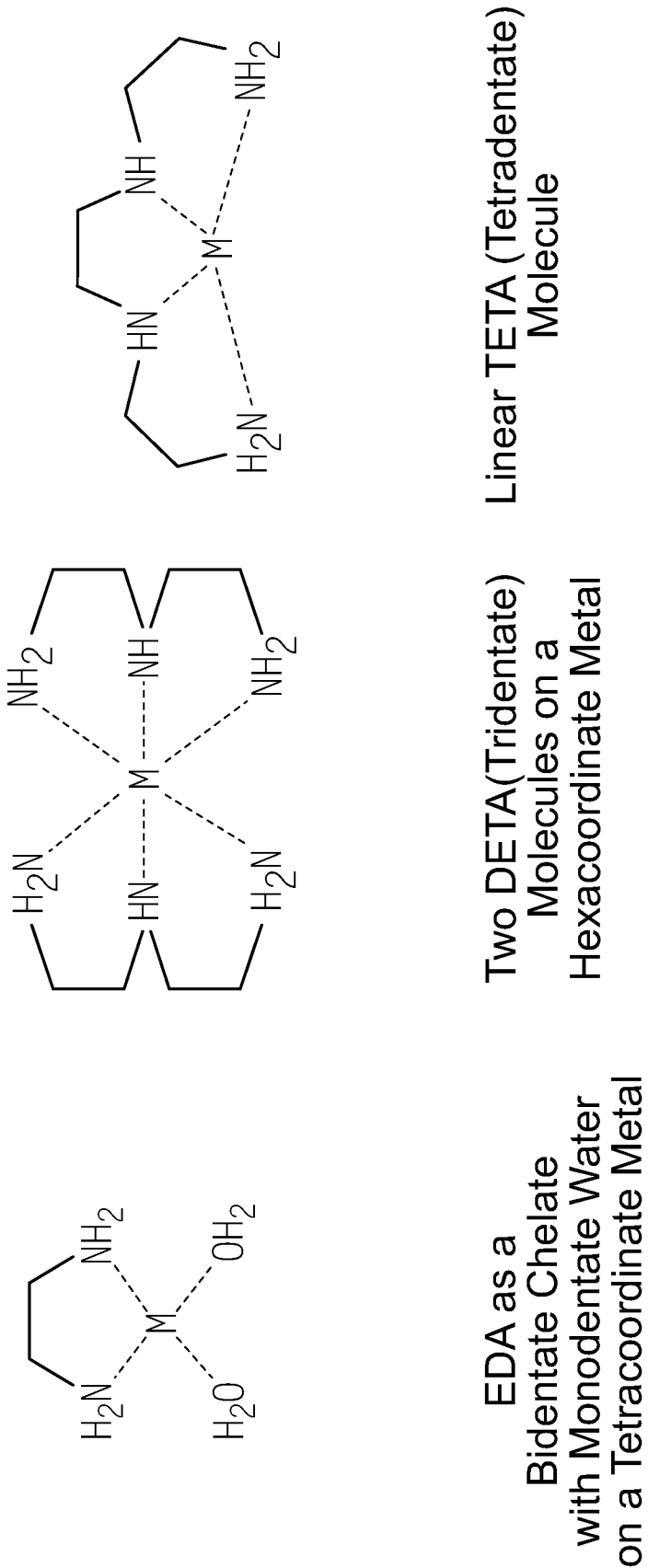
FIG. 1 is a diagram showing formation of stable complexes of a metal ion and amine-containing chelating agents through formation of coordinate covalent bonds.

A reservoir portion of a subterranean formation typically includes a porous layer, such as limestone and sands, overlaid by a nonporous layer. Hydrocarbons typically cannot rise through the nonporous layer, and thus, the porous layer forms a reservoir in which hydrocarbons collect. In a typical drilling operation, a well is drilled through the earth until the porous hydrocarbon bearing formation is reached. Hydrocarbons then are able to flow from the porous formation into the well. The fluids for drilling a well through the porous producing section need to be chosen carefully, to minimize damage to the formation and maximize production of hydrocarbons in the exposed zones.

Accordingly, the present application provides compositions containing a hygroscopic chelating agent, and methods of using such compositions for effective filtration control during drilling through a subterranean hydrocarbon reservoir. Exemplary embodiments of these compositions, and methods of making and using these compositions, are described in the application.

Compositions Containing a Hygroscopic Chelating Agent

In some embodiments, the present disclosure provides a drill-in slurry including a solid particulate material and a hygroscopic chelating agent. In some embodiments, the particulate material includes at least one particle (for example, 1, 2, 3, or multitude of particles) of the solid material. In some embodiments, the hygroscopic chelating agent is adapted to bind to at least one particle of the solid particulate material of the drill-in slurry. In some embodiments, the drill-in slurry includes an aqueous base fluid. In some embodiments, the drill-in slurry is adapted for drilling through the reservoir section of a subterranean formation. In some embodiments, the drill-in slurry includes at least one additional component.

Solid Particulate Materials

In some embodiments, the reservoir drill-in fluid contains a particulate inorganic material such as a metal salt, a metal oxide, or a metal hydroxide. In some embodiments, the metal compound contains a metal ion or a combination of metal ions (for example, $Fe_3O_4$ contains $Fe^{2+}$ and $Fe^{3+}$ cations). Suitable metals include iron (Fe), zinc (Zn), calcium (Ca), and copper (Cu), or any other metal capable of forming a coordination complex with a chelating ligand, such as any of the chelating agents described in the present application. Cobalt (Co), nickel (Ni), aluminum (Al), magnesium (Mg), and barium (Ba) are also suitable examples of metals. The salts, oxides, hydroxides, silicates and other derivatives of these metals may be used as a particulate material in the drill-in slurries.

The solid particulate material may include a clay or a complex mineral, such as aluminium phyllosilicate clay (for example, bentonite, montmorillonite, tonstein, kaolinite, kaolinite, illite), barium sulfate, calcium carbonate, hematite. In one example, the solid particulate material is a mixed metal hydroxide, such as mixed hydroxide of aluminum and magnesium. In another example, the particulate solid is bentonite (smectite clay), calcite, ankerite, quartz, or pyrite. In some embodiments, the particulate solid material is a combination of any of the metals, clays, or complex minerals mentioned in the application.

In some embodiments, the particles of the solid material are present within a population, for example, in a composition, and have substantially the same shape or size, or both (that is, the particles are "monodisperse"). For example, the particles have a distribution such that no more than about 5 percent (%) or about 10% of the particles in the composition have a diameter greater than the average diameter of the particles (for example, D[50]), and in some cases, such that no more than about 8%, about 5%, about 3%, about 1%, about 0.3%, about 0.1%, about 0.03%, or about 0.01% have a diameter greater than the average diameter of the particles.

In some embodiments, the diameter of no more than 25% of the particles varies from the mean particle diameter (D[50]) by more than 150%, 100%, 75%, 50%, 25%, 20%, 10%, or 5% of the mean particle diameter. It is often desirable to use a population of particles of solid material that is relatively uniform in terms of size, shape, or composition so that most of the particles have similar properties. For example, at least 80%, at least 90%, or at least 95% of the particles produced using the methods described in the present application have a diameter or greatest dimension that falls within 5%, 10%, or 20% of the average diameter or greatest dimension. In some embodiments, a population of particles is homogeneous with respect to size, shape, and composition. In other embodiments, a population of particles is heterogeneous with respect to size, shape, and composition.

In some embodiments, the solid particulate material includes calcium carbonate ($CaCO_3$). The calcium carbonate solid in the drill-in slurry may include particulate material having D[50] of particles of calcium carbonate of about 50 microns (μm) (calcium carbonate particulate material type A). In some embodiments, the D[50] of such particulate material is greater than about 50 μm. In other embodiments, the D[50] of such particulate material is less than about 50 μm. The calcium carbonate solid in the drill-in slurry may also include fine particles of $CaCO_3$ (calcium carbonate particulate material type B). In some embodiments, the D[50] of fine particles of calcium carbonate is in the range of about 1 μm to about 20 μm, about 2 μm to about 15 μm, about 3 μm to about 10 μm, about 10 μm to about 15 μm, or about 1 μm to about 5 μm.

In some embodiments, the drill-in slurry contains a combination of calcium carbonate solid particulate material type A and type B. In such embodiments, a weight ratio of type B to type A $CaCO_3$ material is in the range of about 10:1 to about 1:10, about 7:1 to about 1:7, about 5:1 to about 1:5, about 3:1 to about 1:3, or about 2:1, about 1:1, about 1:2, or about 1:3.

In some embodiments, an amount of a solid particulate material in the drill-in slurry is in a range of about 0.1 wt. % to about 50 wt. %, about 0.1 wt. % to about 40 wt. %, about 0.5 wt. % to about 30 wt. %, about 0.5 wt. % to about 15 wt. %, about 1 wt. % to about 25 wt. %, about 1 wt. % to about 20 wt. %, about 5 wt. % to about 50 wt. %, about 5 wt. % to about 30 wt. %, about 5 wt. % to about 25 wt. %, about 5 wt. % to about 20 wt. %, about 10 wt. % to about 25 wt. %, or about 10 wt. % to about 15 wt. %. In some embodiments, an amount of a solid particulate material is about 0.1 wt. %, about 0.5 wt. %, about 1 wt. %, about 5 wt. %, about 10 wt. %, about 12 wt. %, about 15 wt. %, or about 20 wt. %.

The solid particulate material of the drill-in fluid described in the present application may fill in the reservoir pores and form a coating (mudcake) on the surface of the reservoir walls. Some amount of mudcake on the wall of a borehole is desirable, as the mudcake provides integrity to the wall of the wellbore and serves as a physical barrier to inhibit loss of the base fluid to the reservoir, and also prevents premature flow of the recoverable fluid into the well. However, a mudcake that is too thick may lead to a reduction in or complete loss of permeability of the pores of a reservoir, and thus lead to decreased productivity of the well.

In some embodiments, the solid particulate material reacts with at least one hygroscopic chelating material described in the application by forming a coordination complex between the chelating agent and a metal ion of a solid particulate material. The chelating agent is soluble in the aqueous base fluid of the drill-in slurry. By forming a complex with a particle of the solid material in the slurry, the chelating agent decreases the thickness of the mudcake on the wall of the wellbore. The wellbore with reduced mudcake thickness remains permeable to recoverable fluids when the well is completed (for example, casing is placed downhole and cemented).

Hygroscopic Chelating Agents

Suitable hygroscopic chelating agents include polyamine compounds containing two or more nitrogen atoms (for example, 2, 3, 4, 6, 8, 12, or more primary, secondary, or tertiary amino groups). For example, the hygroscopic chelating agent is a compound of Formula (I):

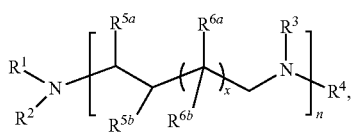

(I)

or a salt thereof, in which:

$R^1$, $R^2$ and $R^4$ are independently selected from the group consisting of H, $C_{1-6}$ alkyl, $C_{2-6}$ alkenyl, $C_{2-6}$ alkynyl, $Cy^1$, $C(O)R^b$, $C(O)NR^cR^d$, $C(O)OR^a$, $S(O)_2R^b$, $S(O)_2NR^cR^d$; where the $C_{1-6}$ alkyl, $C_{2-6}$ alkenyl and $C_{2-6}$ alkynyl are each optionally substituted with 1, 2, 3, or 4 substituents independently selected from the group consisting of halo, $Cy^2$, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{b1}$, $NR^{c1}C(O)NR^{c1}R^{d1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$;

each $R^3$, $R^{5a}$, $R^{5b}$, $R^{6a}$ and $R^{6b}$ is independently selected from the group consisting of H, $C_{1-6}$ alkyl, $C_{2-6}$ alkenyl, $C_{2-6}$ alkynyl, $Cy^1$, $C(O)R^b$, $C(O)NR^cR^d$, $C(O)OR^a$, $S(O)_2R^b$, $S(O)_2NR^cR^d$ and a group of formula (i):

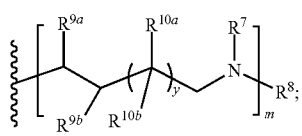

(i)

in which the $C_{1-6}$ alkyl, $C_{2-6}$ alkenyl and $C_{2-6}$ alkynyl are each optionally substituted with 1, 2, 3, or 4 substituents independently selected from the group consisting of halo, $Cy^2$, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{b1}$, $NR^{c1}C(O)NR^{c1}R^{d1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$;

or alternatively, when x is 1, 2, or 3, any two $R^3$ and $R^{5a}$ groups together with the carbon atom to which $R^{5a}$ is attached, the carbon atom to which $R^{6a}$ and $R^{6b}$ are attached and the nitrogen atom to which $R^3$ is attached form a 5-10 membered heterocycloalkyl, which is optionally substituted with 1, 2, or 3 independently selected $R^g$ substituents;

or alternatively, when n is an integer between 2 and 100, any two adjacent $R^3$ groups together with the nitrogen atoms to which they are attached, the carbon atom to which $R^{5a}$ and $R^{5b}$ are attached and the carbon atom to which $R^{6a}$ and $R^{6b}$ are attached form a 5-10 membered heterocycloalkyl, which is optionally substituted with 1, 2, or 3 independently selected $R^g$ substituents;

each $R^7$, $R^8$, $R^{9a}$, $R^{9b}$, $R^{10a}$ and $R^{10b}$ is independently selected from the group consisting of H, $C_{1-6}$ alkyl, $C_{2-6}$ alkenyl, $C_{2-6}$ alkynyl, $Cy^1$, $C(O)R^b$, $C(O)NR^cR^d$, $C(O)OR^a$, $S(O)_2R^b$, $S(O)_2NR^cR^d$; where the $C_{1-6}$ alkyl, $C_{2-6}$ alkenyl and $C_{2-6}$ alkynyl are each optionally substituted with 1, 2, 3, or 4 substituents independently selected from the group consisting of halo, $Cy^2$, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{b1}$, $NR^{c1}C(O)NR^{c1}R^{d1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$;

or alternatively, when y is 1, 2, or 3, any two $R^7$ and $R^{9a}$ groups together with the carbon atom to which $R^{9a}$ is attached, the carbon atom to which $R^{10a}$ and $R^{10b}$ are attached and the nitrogen atom to which $R^7$ is attached form a 5-10 membered heterocycloalkyl, which is optionally substituted with 1, 2, or 3 independently selected $R^g$ substituents;

or alternatively, when m is an integer between 2 and 100, any two adjacent $R^7$ groups together with the nitrogen atoms to which they are attached, the carbon atom to which $R^{9a}$ and $R^{9b}$ are attached and the carbon atom to which $R^{10a}$ and $R^{10b}$ are attached form a 5-10 membered heterocycloalkyl, which is optionally substituted with 1, 2, or 3 independently selected $R^g$ substituents;

each n and m is independently an integer between 1 and 100;

each x and y is independently an integer between 0 and 10;

each $Cy^1$ and $Cy^2$ is independently selected from the group consisting of $C_{3-7}$ cycloalkyl, 4-7 membered heterocycloalkyl, 6-12 membered aryl, and 5-14 membered heteroaryl, each of which is optionally substituted with 1, 2, 3, or 4 substituents independently selected from $R^{Cy}$;

each $R^{Cy}$ is independently selected from the group consisting of $C_{1-6}$ alkyl, $C_{2-6}$ alkenyl, $C_{2-6}$ alkynyl, halo, CN, $OR^{a2}$, $SR^{a2}$, $C(O)R^{b2}$, $C(O)NR^{c2}R^{d2}$, $C(O)OR^{a2}$, $OC(O)R^{b2}$, $OC(O)NR^{c2}R^{d2}$, $NR^{c2}R^{d2}$, $NR^{c2}C(O)R^{b2}$, $NR^{c2}C(O)OR^{a2}$, $NR^{c2}C(O)NR^{c2}R^{d2}$ $NR^{c2}S(O)R^{b2}$, $NR^{c2}S(O)_2R^{b2}$, $NR^{c2}S(O)_2NR^{c2}R^{d2}$, $S(O)_2R^{b2}$, and $S(O)_2NR^{c2}R^{d2}$; where the $C_{1-6}$ alkyl, $C_{2-6}$ alkenyl, and $C_{2-6}$ alkynyl are each optionally substituted with 1, 2, or 3 substituents independently selected from halo, CN, $OR^{a3}$, $SR^{a3}$, $C(O)R^{b3}$, $C(O)NR^{c3}R^{d3}$, $C(O)OR^{a3}$, $OC(O)R^{b3}$, $OC(O)NR^{c3}R^{d3}$, $NR^{c3}R^{d3}$, $NR^{c3}C(O)R^{b3}$, $NR^{c3}C(O)OR^{a3}$, $NR^{c3}C(O)NR^{c3}R^{d3}$, $NR^{c3}S(O)_2R^{b3}$, $NR^{c3}S(O)_2NR^{c3}R^{d3}$, $S(O)_2R^{b3}$, and $S(O)_2NR^{c3}R^{d3}$;

each $R^a$, $R^b$, $R^c$, $R^d$, $R^{a1}$, $R^{b1}$, $R^{c1}$, $R^{d1}$, $R^{a2}$, $R^{b2}$, $R^{c2}$, $R^{d2}$, $R^{a3}$, $R^{b3}$, $R^{c3}$, and $R^{d3}$ is independently selected from H, $C_{1-6}$ alkyl, $C_{2-6}$ alkenyl, $C_{2-6}$ alkynyl, $C_{3-7}$ cycloalkyl, 4-7 membered heterocycloalkyl, 6-12 membered aryl, and 5-14 membered heteroaryl; where each $C_{1-6}$ alkyl, $C_{2-6}$ alkenyl, $C_{2-6}$ alkynyl, $C_{3-7}$ cycloalkyl, 4-7 membered heterocycloalkyl, 6-12 membered aryl, and 5-14 membered heteroaryl is optionally substituted with 1, 2, or 3 independently selected substituents $R^g$;

or alternatively, any $R^c$ and $R^d$ attached to the same N atom, any $R^{c1}$ and $R^{d1}$ attached to the same N atom, any $R^{c2}$ and $R^{d2}$ attached to the same N atom, and any $R^{c3}$ and $R^{d3}$ attached to the same N atom, together with the with the N atom to which they are attached, form a 4-6 membered heterocycloalkyl group or a 5-6 membered heteroaryl group, each optionally substituted with 1, 2, or 3 independently selected $R^g$ groups;

each $R^g$ is independently selected from the group consisting of OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl) carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkyl aminosulfonylamino, di($C_{1-6}$ alkyl)aminosulfonylamino, aminocarbonylamino, $C_{1-6}$ alkyl aminocarbonylamino, and di($C_{1-6}$ alkyl)aminocarbonylamino.

In some embodiments, n is an integer between 1 and 20. For example, n is an integer from 1 to 15, 1 to 10, 1 to 5, 2 to 20, 2 to 15, or 2 to 10. In some embodiments, n is 1. In other embodiments, n is 2. In yet other embodiments, n is 3. In yet other embodiments, n is 4, 5, 8, 10, or 12.

In some embodiments, x is 0. In other embodiments, x is 1. In yet other embodiments, x is 2 or 3. In some embodiments, x is 1, 2, or 3.

In some embodiments, $R^1$ is H or $C_{1-3}$ alkyl.
In some embodiments, $R^2$ is H or $C_{1-3}$ alkyl.
In some embodiments, $R^4$ is H or $C_{1-3}$ alkyl.
In some embodiments, each of $R^1$, $R^2$ and $R^4$ is H.
In some embodiments, $R^1$ and $R^2$ are each $C_{1-3}$ alkyl; and $R^4$ is H.
In some embodiments, $R^1$ and $R^2$ are each H; and $R^4$ is $C_{1-3}$ alkyl.

In some embodiments, $R^{5a}$ and $R^{5b}$ at each occurrence are independently selected from H and $C_{1-3}$ alkyl. In some embodiments, at least at one occurrence $R^{5a}$ is H, and $R^{5b}$ is $C_{1-3}$ alkyl. In other embodiments, at each occurrence $R^{5a}$ and $R^{5b}$ are each H.

In some embodiments, when x is 1 or greater, $R^{6a}$ and $R^{6b}$ at each occurrence are independently selected from H and $C_{1-3}$ alkyl. In some embodiments, at least at one occurrence $R^{6a}$ is H, and $R^{6b}$ is $C_{1-3}$ alkyl. In other embodiments, at each occurrence $R^{6a}$ and $R^{6b}$ are each H.

In some embodiments, at each occurrence, $R^3$ is independently selected from H, $C_{1-6}$ alkyl, $C_{2-6}$ alkenyl, $Cy^1$, C(O) $R^b$, C(O)$NR^cR^d$, $S(O)_2R^b$, $S(O)_2NR^cR^d$, and a group of formula (i); where the $C_{1-6}$ alkyl, $C_{2-6}$ alkenyl and $C_{2-6}$ alkynyl are each optionally substituted with 1, 2, or 3 substituents independently selected from $Cy^2$, CN, $NO_2$, $OR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$ $NR^{c1}S(O)_2R^{b1}$, $NR^{c1}S(O)_2NR^{c1}R^{d1}$, $S(O)_2R^{b1}$, and $S(O)_2NR^{c1}R^{d1}$.

In some embodiments, each $R^3$ is independently selected from the group consisting of H, $C_{1-6}$ alkyl, $Cy^1$, and a group of formula (i); where the $C_{1-6}$ alkyl is optionally substituted with 1, 2, or 3 substituents independently selected from $Cy^2$ and $NR^{c1}R^{d1}$.

In some embodiments, each $R^3$ is independently selected from the group consisting of H, $C_{1-6}$ alkyl, and $Cy^1$; where the $C_{1-6}$ alkyl is optionally substituted with 1, 2, or 3 substituents independently selected from the group consisting of $Cy^2$, $OR^{a1}$, $C(O)NR^cR^{d1}$, $NR^{c1}R^{d1}$, $NR^{c1}C(O)R^{b1}$, $NR^{c1}S(O)_2R^{b1}$, $NR^{c1}S(O)_2NR^cR^{d1}$, $S(O)_2R^{b1}$, and $S(O)_2NR^{c1}R^{d1}$.

In some embodiments, each $R^3$ is independently H or $C_{1-6}$ alkyl; where the $C_{1-6}$ alkyl is optionally substituted with 1 or 2 $NR^{c1}R^{d1}$ groups. In some aspects of these embodiments, each of $R^{c1}$ and $R^{d1}$ is H (that is, the $C_{1-6}$ alkyl is optionally substituted with 1 or 2 amino groups).

In some embodiments, at least at one occurrence, $R^3$ is $Cy^1$. In some aspects of these embodiments, $Cy^1$ is 4-7 membered heterocycloalkyl, optionally substituted with 1 or 2 $R^{Cy}$ substituents. For example, $Cy^1$ is a pyrrolidinyl, a piperidinyl, a piperazinyl, or a morpholinyl, each of which may be optionally substituted with 1 or 2 $NR^{c2}R^{d2}$ groups (for example, when each of $R^{c2}$ and $R^{d2}$ is H).

In some embodiments, at least at one occurrence, $R^3$ is a $C_{1-6}$ alkyl optionally substituted with $Cy^2$ or $NR^{c1}R^{d1}$. In some aspects of these embodiments, $R^3$ is methyl, ethyl, propyl, isopropyl, or n-butyl, each of which is optionally substituted with an amino group. In other aspects of these embodiments, $R^3$ is methyl, ethyl, propyl, isopropyl, or n-butyl, each of which is optionally substituted with a 4-7 membered heterocycloalkyl, which is optionally substituted with 1 or 2 $NR^{c2}R^{d2}$ groups. Suitable examples of heterocycloalkyl groups include pyrrolidinyl, piperidinyl, piperazinyl, and morpholinyl. For example, $R^3$ is any of the following groups:

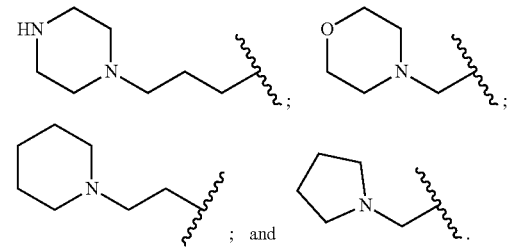

In some embodiments, x is 1 or 2, and at least at one occurrence any two $R^3$ and $R^{5a}$ groups together with the carbon atom to which $R^{5a}$ is attached, the carbon atom to which $R^{6a}$ and $R^{6b}$ are attached and the nitrogen atom to which $R^3$ is attached form a 5-10 membered heterocycloalkyl, which is optionally substituted with 1, 2, or 3 independently selected $R^g$ substituents. For example, any two $R^3$ and $R^{5a}$ groups form a pyrrolidinyl, piperidinyl, piperazinyl, or morpholinyl, each of which is optionally substituted with 1 or 2 substituents independently selected from amino, $C_{1-6}$ alkylamino and di($C_{1-6}$ alkyl)amino. In one example, when any two $R^3$ and $R^{5a}$ groups form a ring as described in the present application, the compound of Formula (I) contains any one of the following fragments:

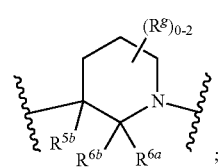

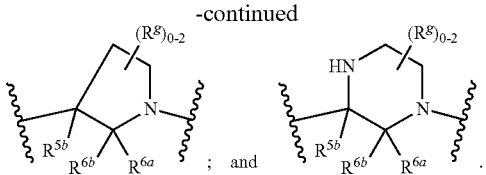

In some embodiments, n is an integer between 2 and 20, and at least at one occurrence any two adjacent $R^3$ groups together with the nitrogen atoms to which they are attached, the carbon atom to which $R^{5a}$ and $R^{5b}$ are attached and the carbon atom to which $R^{6a}$ and $R^{6b}$ are attached form a 5-10 membered heterocycloalkyl, which is optionally substituted with 1, 2, or 3 independently selected $R^g$ substituents. For example, any two $R^3$ groups form a pyrrolidinyl, piperidinyl, piperazinyl, or morpholinyl ring, each of which is optionally substituted with 1 or 2 substituents independently selected from amino, $C_{1-6}$ alkylamino and di($C_{1-6}$ alkyl)amino. In one example, when any two $R^3$ groups form a ring as described in the present application, the compound of Formula (I) contains the following fragment:

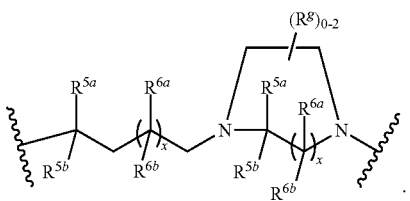

In some embodiments, $R^3$ and $R^4$ are each H. In some embodiments, $R^3$ is H, and $R^4$ is $C_{1-3}$ alkyl. In other embodiments, $R^4$ is H, and $R^3$ is $C_{1-3}$ alkyl. In yet other embodiments, $R^3$ and $R^4$ are each $C_{1-3}$ alkyl.

In some embodiments, $R^3$ at least at one occurrence is a group of formula (i)

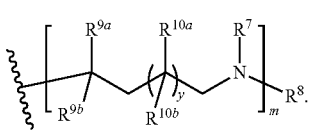

(i)

In some embodiments, m is an integer between 2 and 20. For example, m is an integer from 1 to 15, 1 to 10, 1 to 5, 2 to 20, 2 to 15, or 2 to 10. In some embodiments, m is 1. In other embodiments, m is 2. In yet other embodiments, m is 3. In yet other embodiments, m is 4, 5, 8, 10, or 12.

In some embodiments, y is 1, 2, or 3. In some embodiments, y is 1.

In some embodiments, $R^8$ selected from the group consisting of H and $C_{1-3}$ alkyl. In some embodiments, $R^8$ is H. In some embodiments, $R^8$ is $C_{1-3}$ alkyl.

In some embodiments, $R^{9a}$ and $R^{9b}$ at each occurrence are independently selected from H and $C_{1-3}$ alkyl. In some embodiments, $R^{9a}$ and $R^{9b}$ are each H at every occurrence.

In some embodiments, $R^{10a}$ and $R^{10b}$ at each occurrence are independently selected from the group consisting of H and $C_{1-3}$ alkyl. In some embodiments, $R^{10a}$ and $R^{10b}$ are each H at every occurrence.

In some embodiments, each $R^7$ is independently selected from the group consisting of H, $C_{1-6}$ alkyl, $Cy^1$; where the $C_{1-6}$ alkyl is optionally substituted with 1, 2, or 3 substituents independently selected from $Cy^2$ and $NR^{c1}R^{d1}$.

In some embodiments, at least at one occurrence, $R^7$ is $Cy^1$. In some aspects of these embodiments, $Cy^1$ is 4-7 membered heterocycloalkyl, optionally substituted with 1 or 2 $R^{Cy}$ substituents. For example, $Cy^1$ is a pyrrolidinyl, a piperidinyl, a piperazinyl, or a morpholinyl, each of which may be optionally substituted with 1 or 2 $NR^{c2}R^{d2}$ groups (for example, when each of $R^{c2}$ and $R^{d2}$ is H).

In some embodiments, at least at one occurrence, $R^7$ is a $C_{1-6}$ alkyl optionally substituted with $Cy^2$ or $NR^{c1}R^{d1}$. In some aspects of these embodiments, $R^7$ is methyl, ethyl, propyl, isopropyl, or n-butyl, each of which is optionally substituted with an amino group. In other aspects of these embodiments, $R^7$ is methyl, ethyl, propyl, isopropyl, or n-butyl, each of which is optionally substituted with a 4-7 membered heterocycloalkyl, which is optionally substituted with 1 or 2 $NR^{c2}R^{d2}$ groups. Suitable examples of heterocycloalkyl groups include pyrrolidinyl, piperidinyl, piperazinyl, and morpholinyl. For example, $R^7$ is any of the following groups:

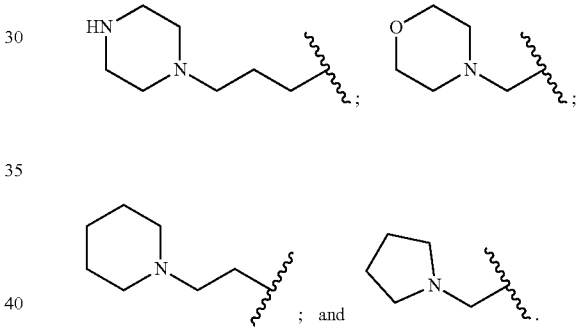

In some embodiments, y is 1 or 2, and at least at one occurrence any two $R^7$ and $R^{9a}$ groups together with the carbon atom to which $R^{9a}$ is attached, the carbon atom to which $R^{10a}$ and $R^{10b}$ are attached and the nitrogen atom to which $R^7$ is attached form a 5-10 membered heterocycloalkyl, which is optionally substituted with 1, 2, or 3 independently selected $R^g$ substituents. For example, any two $R^7$ and $R^{9a}$ groups form a pyrrolidinyl, piperidinyl, piperazinyl, or morpholinyl, each of which is optionally substituted with 1 or 2 substituents independently selected from amino, $C_{1-6}$ alkylamino and di($C_{1-6}$ alkyl)amino.

In some embodiments, m is an integer between 2 and 20, and at least at one occurrence any two adjacent $R^7$ groups together with the nitrogen atoms to which they are attached, the carbon atom to which $R^{9a}$ and $R^{9b}$ are attached and the carbon atom to which $R^{10a}$ and $R^{10b}$ are attached form a 5-10 membered heterocycloalkyl, which is optionally substituted with 1, 2, or 3 independently selected $R^g$ substituents. For example, any two $R^7$ groups form a pyrrolidinyl, piperidinyl, piperazinyl, or morpholinyl ring, each of which is optionally substituted with 1 or 2 substituents independently selected from amino, $C_{1-6}$ alkylamino and di($C_{1-6}$ alkyl)amino.

In some embodiments, R⁷ selected from the group consisting of H and C₁₋₆ alkyl; where the C₁₋₆ alkyl is optionally substituted with 1 or 2 amino groups.

In some embodiments, R⁷ is H.

In some embodiments, R³ at least at one occurrence is a group of formula (i-b)

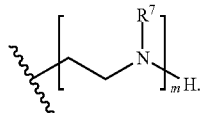
(i-b)

In some embodiments, R³ at least at one occurrence is a group of formula (i-a)

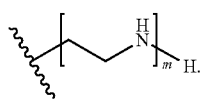
(i-a)

In some embodiments, the compound of Formula (I) has Formula (Ic)

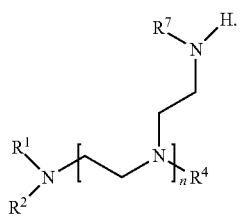
(Ic)

In some embodiments, the compound of Formula (I) has Formula (Ia)

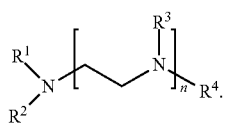
(Ia)

In some embodiments of Formula (Ia), R³ is selected from H, CH₃, a group of formula (i-b), and a group of formula (i-a). In some aspects of these embodiments, R¹, R² and R⁴ are each independently selected from H and C₁₋₃ alkyl. For example, each of R¹, R² and R⁴ is H.

In some embodiments, the compound of Formula (I) has Formula (Ib):

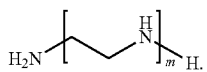
(Ib)

In some embodiments of Formula (Ib), n is 2, 3, 4, 5, 6, 8, 10, or 12.

In some embodiments, the hygroscopic chelating agent contains only one compound of Formula (I). In other embodiments, the hygroscopic chelating agent contains two or more compounds of Formula (I). For example, the hygroscopic chelating agent includes 2, 3, 4, or 5 compounds of Formula (I).

Suitable examples of the compound of Formula (I) include:

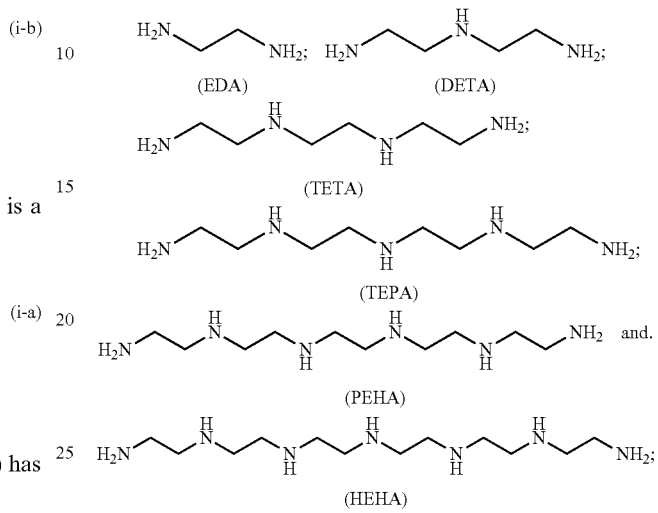

In some embodiments, the hygroscopic chelating agent includes any combination of ethylenediamine (EDA), diethylenetriamine (DETA), triethylenetetramine (TETA), tetraethylenepentamine (TEPA), pentaethylenehexamine (PEHA), and hexamethylenetetramine (HEHA). For example, the hygroscopic chelating agent includes TETA and TEPA (for example, in equal amount by weight).

Other suitable examples of the compound of Formula (I) include:

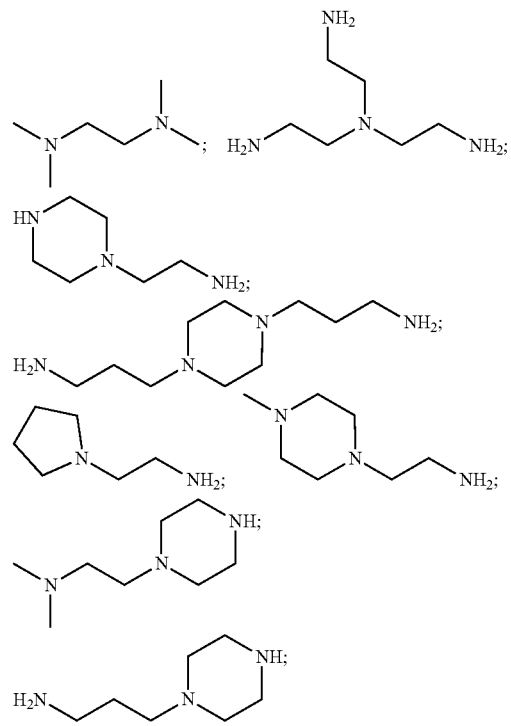

-continued

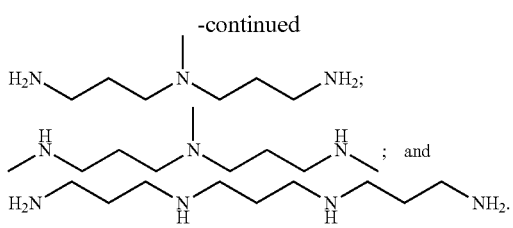

The hygroscopic chelating agent may include any of these compounds, alone or in combination with the compounds described in the present application, such as TEPA.

In some embodiments, the drill-in slurry includes hygroscopic chelating agent in an amount of about 0.1 wt. % to about 20 wt. %, about 0.1 wt. % to about 10 wt. %, about 0.1 wt. % to about 5 wt. %, about 0.1 wt. % to about 2 wt. %, about 0.5 wt. % to about 20 wt. %, about 0.5 wt. % to about 10 wt. %, about 0.5 wt. % to about 5 wt. %, about 1 wt. % to about 20 wt. %, about 1 wt. % to about 10 wt. %, about 1 wt. % to about 5 wt. %, or about 1 wt. % to about 2 wt. %. In some embodiments, the drill-in slurry includes hygroscopic chelating agent in an amount of about 0.1 wt. %, about 0.25 wt. %, about 0.5 wt. %, about 0.75 wt. %, about 1 wt. %, about 1.5 wt. %, about 2 wt. %, about 5 wt. %, about 10 wt. %, or about 20 wt. %.

In some embodiments, any one of the compounds of Formula (I) is hygroscopic. That is, any one of the compounds described in the present application may attract and non-covalently bind at least one molecule of water. The examples of non-covalent binding includes hydrogen bonds, Van-der-Waals forces, and electrostatic attraction. In some embodiments, the compound of Formula (I) is hygroscopic due to its ability to form hydrogen bonds with the molecules of water (for example, a non-covalent bond between a hydrogen atom of a water molecule and a nitrogen atom of a compound of Formula (I)). In some embodiments, a molecule of a compound of Formula (I) non-covalently binds to 1-100 molecules of water. By binding water in the drill-in slurry, the hygroscopic agent retains the water inside the wellbore, and prevents the water from entering the reservoir as a filtrate.

In some embodiments, any one of the compounds of Formula (I) chelates a metal ion in the solid particulate material described in the present application. Exemplary chelation complexes are shown in FIG. 1. Referring to FIG. 1, at least one molecule of the chelating agent such as EDA, DETA, or TETA serves as a ligand in a coordination complex with a metal ion M. The dashed bonds represent coordinate covalent bonds between the ligands and the metal. By forming such a coordinate complex with the metal ion, the chelating agent binds to the solid particle and promotes retention of the solid particle in the fluid phase of the drill-in slurry.

In some embodiments, the chelation reaction occurs under conditions that are typical for a wellbore in a subterranean formation, such as any typical drilling temperature or pressure. In some embodiments, the chelation reaction occurs within 1-2 hours at room temperature and atmospheric pressure (for example, standard conditions). In other embodiments, the chelation reaction occurs in less than 1 hour at a temperature in a range of about 200 Fahrenheit (° F.) to about 300° F. In yet other embodiments, the chelation reaction occurs in an amount of time greater than 1 hour at a temperature in a range of about 200° F. to about 300° F. In some embodiments, the chelation reaction occurs at a pressure from about 200 pounds per square inch (psi) to about 600 psi. In some embodiments, once the hygroscopic chelating agent has chelated the at least one solid particle of the solid particulate material in the drill-in slurry, the solid particle remains in the fluid phase of the slurry and does not contribute to the thickness of the mudcake on the wall of the wellbore.

Aqueous Base Fluid

In some embodiments, the reservoir drill-in slurry contains a fluid phase and a solid phase. In some aspects of these embodiments, the fluid phase (base fluid) is aqueous. That is, the base fluid contains water, for example, from about 50 wt. % to about 95 wt. % water.

In some embodiments, the aqueous base fluid includes water, brine, produced water, flowback water, brackish water, sea water, or a mixture thereof. The aqueous base fluid may be any suitable downhole fluid. Suitable examples of the downhole fluid include a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, a carrier fluid, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation (for example, reservoir formation). The drilling fluid can be formulated to prevent unwanted influxes of formation fluids from permeable rocks and also to form a thin, low permeability filter cake (mudcake) that temporarily seals pores, other openings, and formations penetrated by the bit. In water-based drilling fluids, solid particulate material may be suspended in a water or brine solution containing other components. Oils or other non-aqueous liquids can be emulsified in the water or brine or at least partially solubilized (for less hydrophobic non-aqueous liquids), but water is the continuous phase. In some embodiments, a drilling fluid is admixed as a carrier fluid with a solid phase.

Additional Components

In some embodiments, the drill-in slurry containing a hygroscopic chelating agent also contains at least one additional component. It is understood by one skilled in the art that an additive may be classified under more than one category. For example, sodium hydrogen phosphate may be considered as a salt of a weak acid, namely phosphoric acid and a strong base, namely sodium hydroxide. It is also a buffer, because it has both acid and base components that can function as a buffering agent. The same compound can also function as a calcium precipitating agent, since calcium phosphate (that is formed in the reaction between calcium hydroxide or calcium silicate, both of which are components of set cement, and sodium hydrogen phosphate) is insoluble in water. Similarly, citric acid and an organic base such as ethanolamine or an inorganic base such as sodium hydroxide or sodium phosphate forms a buffer system that contains partially neutralized citric acid. The resulting citrate salt is a calcium chelating agent, as well as calcium precipitating agent, and also functions as a component of the buffer system.

In some embodiments, the drill-in slurry includes an inorganic salt. The salt can be about 1% to about 10% by weight of the composition. The salt can be selected from NaCl, NaBr, KCl, KBr, NaHCO$_3$, Na$_2$CO$_3$, CaCl$_2$, MgCl$_2$, NaNO$_3$, KNO$_3$, NaC$_2$H$_3$O$_2$, KC$_2$H$_3$O$_2$, NaCHO$_2$, KCHO$_2$, or combinations thereof. For example, the salt is selected from the group consisting of NaCl, KCl, and combinations thereof. The drill-in slurry may contain a solution of any of these salts. For example, the drill-in slurry contains a saturated solution of sodium chloride (NaCl).

In some embodiments, the drill-in slurry includes one or more organic solvents. Suitable examples of organic solvents include dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone.

The drill-in slurry may include a formate drilling fluid. Such a fluid may include at least one alkali metal formate, such as sodium formate or potassium formate. Other suitable formates may also be included. In some embodiments, the slurry contains at least two formates. An amount of the formate, or a combination of the formates, in the slurry may range from about 10 wt. % to about 80 wt. %, about 20 wt. % to about 60 wt. %, or about 30 wt. % to about 50 wt. %. For example, the slurry contains about 10 wt. %, about 20 wt. %, about 30 wt. %, about 40 wt. %, or about 50 wt. % of a formate or combination of formates.

The slurry may contain a defoamer. Suitable examples of a defoamer include polydimethylsiloxane, fluorosilicone, ethylene oxide/propylene oxide (EO/PO) based defoamer, alkyl polyacrylates, silica (for example, silica dispersed in a silicone oil), long chain fatty alcohol, fatty acid soaps or esters, as well as various surfactants and detergents.

The slurry may also contain a viscosity modifier, such as starch (for example, a crosslinked starch). Other suitable examples of viscosity modifiers include thickeners, gelling agents, acrylates, methacrylates, cellulosics, polyurethanes, polyethers, and other thixotropic agents and rheology modifiers. The drill-in slurry may also include a viscosifier, in addition to, for example, the starch viscosity-modifying agent described in the present application. The viscosifier can be present in any suitable concentration, such as more, less, or an equal concentration as compared to the concentration of the starch component. The viscosifier can include at least one of a substituted or unsubstituted polysaccharide. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

The drill-in slurry may also contain a stabilizer, such as a xanthan gum (XC polymer). Other suitable stabilizers include acrylamide, poly(vinyl pyrrolidone), alkyl sulfate surfactants, and other agents (for example, organic and inorganic compounds) that may add stability to the composition. An amount of an optional additional component in the slurry, such as defoamer, viscosifier, or a stabilizer, or any combination thereof, may vary from about 0.1 wt. % to about 10 wt. %, or from about 0.5 wt. % to about 5 wt. % based on the weight of the slurry. The drill-in slurry may also include an ash, such as a soda ash, and a bicarbonate, such as sodium bicarbonate.

Properties of the Drill-in Slurry

In some embodiments, the drill-in slurry containing a hygroscopic chelating agent retain operably essential features of a conventional reservoir drill-in slurry that lacks the hygroscopic chelating agent. That is, the addition of the hygroscopic chelating agent to a conventional slurry does not compromise the ability of the slurry to prevent formation damage during drilling through the reservoir portion of a subterranean formation. The drill-in slurry as described in the present application shows superior performance when compared to the slurry that lacks the hygroscopic chelating agent. The improved performance leads to lower skin factor and higher production of recoverable fluids from the reservoir.

In some embodiments, pH of the drill-in slurry containing a hygroscopic chelating agent is basic. For example, the slurry has a pH of about, about 7 to about 11, about 8 to about 9, about 7 to about 10, about 8 to about 9, or about 9 to about 11. In one example, the pH of the slurry is about 8, about 9, about 10, or about 11. In some embodiments, the basic pH of the slurry facilitates the chelation reaction between the solid particulate material and the hygroscopic chelating agent. The basic pH also improves the ability of the agent to attract and retain the water molecules, thereby enhancing its hygroscopic properties.

In some embodiments, the density of the slurry (mud weight) is in the range of about 50 pounds per cubic foot (pcf) to about 150 pcf, or about 60 pcf to about 20 pcf. For example, the density of the slurry is about 60 pcf, about 70 pcf, about 85 pcf, about 100 pcf, or about 120 pcf. The density of the slurry enhances the ability of the slurry to create hydrostatic pressure against the walls of the reservoir, thereby preventing an undesired flow of the recoverable fluid from the formation into the unfinished wellbore.

In some embodiments, plastic viscosity of the slurry under standard conditions is in the range of about 10 centipoise (cP) to about 75 cP, or about 20 cP to about 50 cP. In some embodiments, the plastic viscosity of the slurry under harsh conditions (for example, about 250° F. and about 500 psi) is in a range of about 5 cP to about 50 cP, or about 10 cP to about 30 cP. In some embodiments, the harsh conditions are simulated using a hot rolling aging experiment. Similarly, yield point of the drill-in slurry containing a hygroscopic chelating agent under standard conditions is in a range of about 10 pound per square foot (lb/100 ft$^2$) to about 50 lb/100 ft$^2$, or about 10 lb/100 ft$^2$ to about 30 lb/100 ft$^2$. Under harsh subterranean conditions, such as about 250° F. and about 500 psi, the yield point of the slurry may be from about 1 lb/100 ft$^2$ to about 30 lb/100 ft$^2$, or about 5 lb/100 ft$^2$ to about 20 lb/100 ft$^2$.

Method of Treating a Subterranean Formation

Also provided in this disclosure is a method of treating a subterranean formation including drilling into a reservoir section or a producing section of a subterranean. In some embodiments, the method includes obtaining a drilling-in slurry containing a hygroscopic chelating agent, and introducing the slurry to the wellbore that penetrates the reservoir section of the formation.

The drill-in slurry as described in the present application may be prepared from any conventional reservoir drilling slurry by adding a hygroscopic chelating agent to the conventional slurry. This addition may occur uphole of the surface (prior to placing the slurry into the well bore). Alternatively, a conventional slurry may be first introduced to the borehole, followed by addition of the hygroscopic chelating agent, either neat or as a solution in water or any of the aqueous base fluids described in the present application.

As discussed in the present application, using a slurry for drilling through a porous reservoir results in the pores of the reservoir serving as a filter, which produces a filtrate liquid inside the formation and a filter cake (also referred to as a mudcake) on the walls of the borehole. In some embodiments, after the chelation reaction occurs between a hygroscopic chelating agent and a solid particulate material of a drill-in slurry, the use of a drill-in slurry of the present application results in a thin layer of mudcake on the walls of the formation. This is in sharp contrast to a thick mudcake produced on the walls of the reservoir formation when a conventional slurry is used for drilling through the formation (that is, a slurry lacking the chelating agent). The use of the drill-in slurry of the present application also results in lesser filtrate in the reservoir as compared to using a slurry without the hygroscopic agent. In some embodiments, using the drill-in slurry with a hygroscopic chelating agent results in about 10 wt. %, about 20 wt. %, about 30 wt. %, about 40 wt. %, or about 50 wt. % less filtrate, compared to that of a conventional slurry (for example, slurry with identical chemical composition but without the hygroscopic chelating agent). In some embodiments, using the slurry with a hygroscopic chelating agent results in an amount of a mudcake that is from about 25 wt. % to about 80 wt. %, or about 30 wt. % to about 70 wt. % less than an amount of a mudcake produced by a conventional slurry (for example, slurry with identical chemical composition but without the hygroscopic chelating agent).

In some embodiments, when a drill-in slurry containing a hygroscopic chelating agent is used for drilling through the reservoir, the resultant mudcake contains a solid particulate material and the hygroscopic chelating agent. In some aspects of these embodiments, the chelating agent forms a coordinate complex with a metal ion (for example, $Ca^{2+}$) of the solid particulate material (for example, the chelating agent in the mudcake is bound to at least one particle of the solid material). In some embodiments, the chelating agent in the mudcake promotes aggregation of the particles of the solid material in the mudcake. In some embodiments, an amount of a hygroscopic chelating agent in the mudcake is from about 0.1 wt. % to about 50 wt. % of the total amount of the hygroscopic chelating agent in the slurry prior to drilling through the reservoir. In some embodiments, the mudcake containing the hygroscopic chelating agent remains permeable to the recoverable fluids.

Definitions

As used in the present application, the singular forms "a," "an," and "the" include plural referents unless the context clearly dictates otherwise.

As used in the present application, the term "about" means "approximately" (for example, plus or minus approximately 10% of the indicated value).

The term "particle" as used in the present application refers to a composition having a size from about 1 nanometer (nm) to about 1000 µm. The term "microparticle" as used in the present application refers to a particle having a size from about 1000 nm to about 1 mm. The term "nanoparticle" may be used to refer to a particle having a size from about 1 nm to about 1000 nm.

The term "particle size" ("microparticle size") as used in the present application refers to the median size (D[50]) in a distribution of particles. The median size is determined from the average linear dimension of individual particles, for example, the diameter of a spherical particle. Size may be determined by any number of methods in the art, including dynamic light scattering (DLS) and transmission electron microscopy (TEM) techniques. For measurements made using a laser diffraction instrument, or an equivalent method known in the art, the term "median particle size" can be defined as the median particle diameter as determined on an equivalent spherical particle volume basis.

Where the term median is used, it can be understood to describe the particle size that divides the population in half such that 50% of the population is greater than or less than this size. The median particle size is often written as D50, D(0.5) or D[0.5], or similar.

As used in the present application, the term "non-covalent" can refer to an interaction between two or more components, win the present application the bonds between the components are non-covalent bonds, meaning that no atom of one component shares a pair of electrons with an atom of another component. Non-covalent bonds can include weak bonds such as hydrogen bonds, electrostatic effects, it-effects, hydrophobic effects or Van der Waals forces.

As used in the present application, the terms "cation" or "cationic" can refer to a positively charged species, win the present application the atom (or atoms) bearing the positive charge in the cationic species contain lesser number of electrons than the number of protons in the atom's nucleus. In one example, the cation is a positively charged metal ion, such as $Fe^2$, $Fe^{3+}$, or $Al^{3+}$.

The term "room temperature" as used in the present application refers to a temperature of about 15° C. to about 28° C.

The term "standard temperature and pressure" as used in the present application refers to 20° C. and 101 kilopascal (kPa).

As used in the present application, the phrase "optionally substituted" means unsubstituted or substituted. As used in the present application, the term "substituted" means that a hydrogen atom is removed and replaced by a substituent. It is to be understood that substitution at a given atom is limited by valency.

As used in the present application, the term "$C_{n-m}$ alkyl", employed alone or in combination with other terms, refers to a saturated hydrocarbon group that may be straight-chain (linear) or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used in the present application, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used in the present application, "$C_{n-m}$ alkynyl" means a straight or branched chain chemical group containing only carbon and hydrogen, containing n to m carbon atoms and containing at least one carbon-carbon triple bond, such as ethynyl, 1-propynyl, 1-butynyl, 2-butynyl, and the like. In various embodiments, alkynyl groups can either be unsubstituted or substituted with one or more substituents. Typically, alkynyl groups will contain 2 to 9 carbon atoms (for example, 2 to 6 carbon atoms, 2 to 4 carbon atoms, or 2 carbon atoms).

As used in the present application, the term "$C_{n-m}$ alkoxy", employed alone or in combination with other terms, refers to a group of formula —O—$C_{n-m}$ alkyl, win the present application the alkyl group contains n to m carbon atoms. Examplary alkoxy groups include, but are not limited to, methoxy, ethoxy, propoxy (for example, n-propoxy and isopropoxy), butoxy (for example, n-butoxy and tert-butoxy), and the like. In some embodiments, the alkoxy group has 1 to 6, 1 to 4, or 1 to 3 carbon atoms.

As used in the present application, "halo" refers to a halogen atom such as F, Cl, Br, or I. In some embodiments, a halo is F, Cl, or Br. In other embodiments, halo is F, Cl, or I. In other embodiments, halo is F, I, or Br.

As used in the present application, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, win the present application the alkyl group has n to m carbon atoms. In some embodiments, the haloalkyl group is fluorinated only. In some embodiments, the alkyl group has 1 to 6, 1 to 4, or 1 to 3 carbon atoms.

As used in the present application, "$C_{n-m}$ haloalkoxy" refers to a group of formula —O-haloalkyl having n to m carbon atoms. An example haloalkoxy group is $OCF_3$. In some embodiments, the haloalkoxy group is fluorinated only. In some embodiments, the alkyl group has 1 to 6, 1 to 4, or 1 to 3 carbon atoms.

As used in the present application, the term "amino" refers to a group of formula —$NH_2$.

As used in the present application, the term "$C_{n-m}$ alkylamino" refers to a group of formula —NH(alkyl), win the present application the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (for example, N-(n-propyl)amino and N-isopropylamino), N-butylamino (for example, N-(n-butyl)amino and N-(tert-butyl)amino), and the like.

As used in the present application, the term "di $C_{n-m}$ alkylamino" refers to a group of formula —$N(alkyl)_2$, win the present application each alkyl group independently has n to m carbon atoms. In some embodiments, each alkyl group has 1 to 6, 1 to 4, or 1 to 3 carbon atoms. Examples of dialkylamino groups include, but are not limited to, N,N-methylehtylamino, N,N-diethylamino, N,N-propylethylamino, N,N-butylisopropylamino, and the like.

As used in the present application, "cycloalkyl" refers to non-aromatic saturated or unsaturated cyclic hydrocarbons including cyclized alkyl or alkenyl groups, or both. Cycloalkyl groups can include mono- or polycyclic (for example, having 2, 3 or 4 fused rings) groups and spirocycles. Ring-forming carbon atoms of a cycloalkyl group can be optionally substituted by oxo or sulfido (for example, C(O) or C(S)). Also included in the definition of cycloalkyl are moieties that have one or more aromatic rings fused (that is, having a bond in common with) to the non-aromatic cyclic hydrocarbon, for example, benzo or thienyl derivatives of cyclopentane, cyclohexane, and the like. A cycloalkyl group containing a fused aromatic ring can be attached through any ring-forming atom including a ring-forming atom of the fused aromatic ring. Cycloalkyl groups can have 3, 4, 5, 6, 7, 8, 9, 10, 11, or 12 ring-forming atoms. In some embodiments, the cycloalkyl is a 3-12 membered monocyclic or bicyclic cycloalkyl. In some embodiments, the cycloalkyl is a $C_{3-7}$ monocyclic cycloalkyl. Examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, cyclooctyl, cyclooctenyl, and the like. In some embodiments, cycloalkyl is cyclopropyl, cyclobutyl, cyclopentyl, cyclohexyl, cyclooctyl, or cyclooctenyl. In some embodiments, the cycloalkyl is a cyclooctenyl ring fused with 1 or 2 benzene rings. In some embodiments, the cycloalkyl is a 3-8 membered or 3-7 membered monocyclic cycloalkyl group (for example, $C_{3-8}$ or $C_{3-7}$ cycloalkyl). In some embodiments, the cycloalkyl is a 8-12-membered bicyclic cycloalkyl. In some embodiments, the cycloalkyl is a 8-16-membered bicyclic or tricyclic cycloalkyl (for example, $C_{8-16}$ cycloalkyl). In some embodiments, the cycloalkyl is unsaturated cyclic hydrocarbon group (that is, the cycloalkyl contains at least one double bond).

As used in the present application, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl is a 5-10 membered monocyclic or bicyclic heteroaryl having 1, 2, 3 or 4 heteroatom ring members independently selected from nitrogen, sulfur and oxygen. In some embodiments, the heteroaryl is a 5-6 membered monocyclic heteroaryl having 1 or 2 heteroatom ring members independently selected from nitrogen, sulfur and oxygen. In some embodiments, the heteroaryl is a five-membered or six-membered heteroaryl ring. A five-membered heteroaryl ring is a heteroaryl with a ring having five ring atoms win the present application one or more (for example, 1, 2, or 3) ring atoms are independently selected from N, O, and S. Exemplary five-membered heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms win the present application one or more (for example, 1, 2, or 3) ring atoms are independently selected from N, O, and S. Exemplary six-membered heteroaryls are pyridyl, pyrazinyl, pyrimidinyl, triazinyl and pyridazinyl. The term "heteroarylene" refers to a divalent heteroaryl linking group.

The term "aromatic" refers to a carbocycle or heterocycle having one or more polyunsaturated rings having aromatic character (that is, having (4n+2) delocalized it (pi) electrons where n is an integer).

The term "n-membered" where n is an integer, typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

The term "aryl," employed alone or in combination with other terms, refers to an aromatic hydrocarbon group, which may be monocyclic or polycyclic (for example, having 2, 3 or 4 fused rings). The term "$C_{n-m}$ aryl" refers to an aryl group having from n to m ring carbon atoms. Aryl groups include, for example, phenyl, naphthyl, anthracenyl, phenanthrenyl, indanyl, indenyl and the like. In some embodiments, aryl groups have from 6 to about 20 carbon atoms, from 6 to about 15 carbon atoms, or from 6 to about 10 carbon atoms. In some embodiments, the aryl group is phenyl. The term "arylene" refers to a divalent aryl linking group.

As used in the present application, "heterocycloalkyl" or "aliphatic heterocycle" refers to non-aromatic saturated or unsaturated monocyclic or polycyclic heterocycles having one or more ring-forming heteroatoms selected from O, N, or S. Included in heterocycloalkyl are monocyclic 4-, 5-, 6-, 7-, 8-, 9- or 10-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido groups (for example, C(O), S(O), C(S), or S(O)$_2$). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. In some embodiments, the heterocycloalkyl group is unsaturated (that is, the heterocycloalkyl contains at least one double bond). Also included in the definition of heterocycloalkyl are moieties that have one or more aromatic rings fused (that is, having a bond in common with) to the non-aromatic heterocycle, for example, benzo or thienyl derivatives of piperidine, morpholine, or azepine. A heterocycloalkyl group containing a fused aromatic ring can be attached through any ring-forming atom including a ring-forming atom of the fused aromatic ring. In some embodiments, the heterocycloalkyl is a monocyclic 4-6 membered heterocycloalkyl having 1 or 2 heteroatoms independently selected from nitrogen, oxygen, or sulfur and having one or more oxidized ring members. In some embodiments, the heterocycloalkyl is a monocyclic or bicyclic 4-10 membered heterocycloalkyl having 1, 2, 3, or 4 heteroatoms independently selected from nitrogen, oxygen, or sulfur and having one or more oxidized ring members. In some embodiments, the heterocycloalkyl is a 8-12-membered heterocycloalkyl (for example, bicyclic heterocycloalkyl). In some embodiments, the heterocycloalkyl is a 8-16-membered heterocycloalkyl (for example, bicyclic or tricyclic heterocycloalkyl). In some embodiments, the 8-12 membered bicyclic heterocycloalkyl is a 8-12 membered fused heterocycloalkylaryl group or a 8-12 membered fused heterocycloalkylheteroaryl group. In some embodiments, the heterocycloalkyl is a 9-12 membered bicyclic heterocycloalkyl. In some embodiments, the 9-10 membered bicyclic heterocycloalkyl is a 9-10 membered fused heterocycloalkylaryl group or a 9-10 membered fused heterocycloalkylheteroaryl group. The term "heterocycloalkylene" refers to a divalent heterocycloalkyl linking group.

As used in the present application, the term "$C_{n-m}$ alkoxycarbonyl" refers to a group of formula —C(O)O-alkyl, win the present application the alkyl group has n to m carbon atoms. In some embodiments, the alkyl group has 1 to 6, 1 to 4, or 1 to 3 carbon atoms. Examples of alkoxycarbonyl groups include, but are not limited to, methoxycarbonyl, ethoxycarbonyl, propoxycarbonyl (for example, n-propoxycarbonyl and isopropoxycarbonyl), butoxycarbonyl (for example, n-butoxycarbonyl and tert-butoxycarbonyl), and the like.

As used in the present application, the term "$C_{n-m}$ alkylcarbonyl" refers to a group of formula —C(O)-alkyl, win the present application the alkyl group has n to m carbon atoms. In some embodiments, the alkyl group has 1 to 6, 1 to 4, or 1 to 3 carbon atoms.

Examples of alkylcarbonyl groups include, but are not limited to, methylcarbonyl, ethylcarbonyl, propylcarbonyl (for example, n-propylcarbonyl and isopropylcarbonyl), butylcarbonyl (for example, n-butylcarbonyl and tert-butylcarbonyl), and the like.

As used in the present application, the term "$C_{n-m}$ alkylcarbonylamino" refers to a group of formula —NHC(O)-alkyl, win the present application the alkyl group has n to m carbon atoms. In some embodiments, the alkyl group has 1 to 6, 1 to 4, or 1 to 3 carbon atoms.

As used in the present application, the term "$C_{n-m}$ alkylsulfonylamino" refers to a group of formula —NHS(O)$_2$-alkyl, win the present application the alkyl group has n to m carbon atoms. In some embodiments, the alkyl group has 1 to 6, 1 to 4, or 1 to 3 carbon atoms.

As used in the present application, the term "aminosulfonyl" refers to a group of formula —S(O)$_2$NH$_2$.

As used in the present application, the term "$C_{n-m}$ alkylaminosulfonyl" refers to a group of formula —S(O)$_2$NH(alkyl), win the present application the alkyl group has n to m carbon atoms. In some embodiments, the alkyl group has 1 to 6, 1 to 4, or 1 to 3 carbon atoms.

As used in the present application, the term "di($C_{n-m}$ alkyl)aminosulfonyl" refers to a group of formula —S(O)$_2$N(alkyl)$_2$, win the present application each alkyl group independently has n to m carbon atoms. In some embodiments, each alkyl group has, independently, 1 to 6, 1 to 4, or 1 to 3 carbon atoms.

As used in the present application, the term "aminosulfonylamino" refers to a group of formula —NHS(O)$_2$NH$_2$.

As used in the present application, the term "$C_{n-m}$ alkylaminosulfonylamino" refers to a group of formula —NHS(O)$_2$NH(alkyl), win the present application the alkyl group has n to m carbon atoms. In some embodiments, the alkyl group has 1 to 6, 1 to 4, or 1 to 3 carbon atoms.

As used in the present application, the term "di($C_{n-m}$ alkyl)aminosulfonylamino" refers to a group of formula —NHS(O)$_2$N(alkyl)$_2$, win the present application each alkyl group independently has n to m carbon atoms. In some embodiments, each alkyl group has, independently, 1 to 6, 1 to 4, or 1 to 3 carbon atoms.

As used in the present application, the term "aminocarbonylamino", employed alone or in combination with other terms, refers to a group of formula —NHC(O)NH$_2$.

As used in the present application, the term "$C_{n-m}$ alkylaminocarbonylamino" refers to a group of formula —NHC(O)NH(alkyl), win the present application the alkyl group has n to m carbon atoms. In some embodiments, the alkyl group has 1 to 6, 1 to 4, or 1 to 3 carbon atoms.

As used in the present application, the term "di($C_{n-m}$ alkyl)aminocarbonylamino" refers to a group of formula —NHC(O)N(alkyl)$_2$, win the present application each alkyl group independently has n to m carbon atoms. In some embodiments, each alkyl group has, independently, 1 to 6, 1 to 4, or 1 to 3 carbon atoms.

As used in the present application, the term "$C_{n-m}$ alkylcarbamyl" refers to a group of formula —C(O)—NH(alkyl), win the present application the alkyl group has n to m carbon atoms. In some embodiments, the alkyl group has 1 to 6, 1 to 4, or 1 to 3 carbon atoms.

As used in the present application, the term "thio" refers to a group of formula —SH.

As used in the present application, the term "$C_{n-m}$ alkylthio" refers to a group of formula —S-alkyl, win the present application the alkyl group has n to m carbon atoms. In some embodiments, the alkyl group has 1 to 6, 1 to 4, or 1 to 3 carbon atoms.

As used in the present application, the term "$C_{n-m}$ alkylsulfinyl" refers to a group of formula —S(O)-alkyl, win the present application the alkyl group has n to m carbon atoms. In some embodiments, the alkyl group has 1 to 6, 1 to 4, or 1 to 3 carbon atoms.

As used in the present application, the term "$C_{n-m}$ alkylsulfonyl" refers to a group of formula —S(O)$_2$-alkyl, win the present application the alkyl group has n to m carbon atoms. In some embodiments, the alkyl group has 1 to 6, 1 to 4, or 1 to 3 carbon atoms.

As used in the present application, the term "carbamyl" to a group of formula —C(O)NH$_2$.

As used in the present application, the term "carbonyl", employed alone or in combination with other terms, refers to a —C(=O)— group, which may also be written as C(O).

As used in the present application, the term "carboxy" refers to a —C(O)OH group.

As used in the present application, the term "di($C_{n-m}$-alkyl)carbamyl" refers to a group of formula —C(O)N(alkyl)$_2$, win the present application the two alkyl groups each has, independently, n to m carbon atoms. In some embodiments, each alkyl group independently has 1 to 6, 1 to 4, or 1 to 3 carbon atoms.

As used in the present application, the term "cyano-$C_{1-3}$ alkyl" refers to a group of formula —($C_{1-3}$ alkylene)—CN.

As used in the present application, the term "HO—$C_{1-3}$ alkyl" refers to a group of formula —($C_{1-3}$ alkylene)—OH.

The term "downhole" as used in the present application refers to under the surface of the earth, such as a location within or fluidly connected to a wellbore.

As used in the present application, the terms "aqueous", "aqueous solvent" or "aqueous fluid" refer to a liquid containing at least 50%, at least 60%, at least 70%, at least 90% or at least 95% water. In some embodiments, aqueous fluid is water.

As used in the present application, the term "drilling fluid" refers to fluids, slurries, or muds used in drilling operations downhole, such as during the formation of the wellbore.

As used in the present application, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in the present application, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake (mudcake).

As used in the present application, the term "fracturing fluid" refers to fluids or slurries used downhole during fracturing operations.

As used in the present application, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used in the present application, the term "completion fluid" refers to fluids or slurries used downhole during the completion phase of a well, including cementing compositions.

As used in the present application, the term "remedial treatment fluid" refers to fluids or slurries used downhole for remedial treatment of a well. Remedial treatments can include treatments designed to increase or maintain the production rate of a well, such as stimulation or clean-up treatments.

As used in the present application, the term "abandonment fluid" refers to fluids or slurries used downhole during or preceding the abandonment phase of a well.

As used in the present application, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used in the present application, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used in the present application, the term "packer fluid" refers to fluids or slurries that can be placed in the annular region of a well between tubing and outer casing uphole of packer. In various examples, the packer fluid can provide hydrostatic pressure in order to lower differential pressure across the sealing element, lower differential pressure on the wellbore and casing to prevent collapse, and protect metals and elastomers from corrosion.

As used in the present application, a "carrier fluid" refers to any suitable fluid for suspending, dissolving, mixing, or emulsifying with one or more materials (solid particulate materials) to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (for example, a fatty acid methyl ester), 2-butoxy ethanol, butyl acetate, butyl lactate, furfuryl acetate, dimethyl sulfoxide, dimethyl formamide, a petroleum distillation product of fraction (for example, diesel, kerosene, napthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 wt. % to about 99.999 wt. % of a composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

As used in the present application, the term "fluid" refers to liquids and gels, unless otherwise indicated.

As used in the present application, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact with the material.

Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact with the subterranean formation or material. For example, a subterranean formation or material can be at least one of an area desired to be fractured, a fracture or an area surrounding a fracture, and a flow pathway or an area surrounding a flow pathway, win the present application a fracture or a flow pathway can be optionally fluidly connected to a subterranean petroleum- or water-producing region, directly or through one or more fractures or flow pathways.

As used in the present application, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

EXAMPLES

Example 1—Chemical Composition and Properties of a Base Case Fluid

A high performance reservoir drill-in fluid was formulated to serve as a base case fluid. The density of the fluid is 85 pcf (pounds per cubic foot). The formulation and rheological properties of the fluid are listed in Tables 1 and 2, respectively.

TABLE 1

The formulation of the 85 pcf water based formate reservoir drill-in fluid

| Component | Weight grams (g) |
|---|---|
| Water | 219.33 |
| Sodium Formate | 137.4 |
| Potassium Formate | 58.58 |
| Defoamer | 0.01 |
| Premium Starch | 7 |
| XC polymer | 0.5 |
| Sodium Bicarbonate | 2 |

TABLE 1-continued

The formulation of the 85 pcf water based formate reservoir drill-in fluid

| Component | Weight grams (g) |
|---|---|
| Soda Ash | 3 |
| Calcium Carbonate fine | 20 |
| Calcium Carbonate-50 μm. | 40 |

Premium starch in the base formulation was used to control fluid loss in water muds ranging from freshwater to saturated-salt to high-pH lime muds. Starches have a thermal stability of about 250° F. (121° C.). Starches can be subject to bacterial attack unless protected by high salinity or bactericide. Drilling-grade natural starch has American Petroleum Institute (API) and International Organization for Standardization (ISO) specifications for quality. Starches are carbohydrates of a general formula $(C_6H_{10}O_5)_n$ and can be derived from corn, wheat, oats, rice, potatoes, *yucca*, and similar plants and vegetables. Starches consist of about 27% linear polymer (for example, amylose) and about 73% branched polymer (for example, amylopectin), in which the two polymers are intertwined within starch granules. Granules are insoluble in cold water, but soaking in hot water or under steam pressure ruptures their covering and the polymers hydrate into a colloidal suspension. The premium starch used in the base formulation was a pre-gelatinized starch containing amylose and amylopectin, which are non-ionic polymers that do not interact with electrolytes. Derivatized starches, such as hydroxypropyl and carboxymethyl starches, are used in drill-in fluids, completion fluids and various brine systems as well as in drilling-mud systems. The use of starch typically causes a minimal increase in viscosity while effectively controlling fluid loss. The "premium starch" listed in Table 1 is a commercial product from Baroid IDP.

TABLE 2

The rheological properties the 85 pcf water based formate reservoir drill-in fluid

| Property | Value |
|---|---|
| pH | 10 |
| Density, pcf | 85 |
| RPM | Reading |
| 600 | 113 |
| 300 | 68 |
| 200 | 51 |
| 100 | 32 |
| 6 | 7 |
| 3 | 4 |
| Plastic Viscosity (PV), cP (600 reading − 300 reading) | 45 |
| Yield Point (YP), lb/100 ft² (300 reading − PV) | 23 |
| High pressure, high temperature (HPHT) Fluid Loss, mL at 200° F. | 12.5 |
| HPHT Mudcake Thickness, mm | 3.5 |

The rheology of the fluid was characterized in terms of its plastic viscosity (PV), yield point (YP), and low shear yield point (LSYP). The YP and PV are parameters from the Bingham Plastic rheology (BP) model. The YP is determined by extrapolating the BP model to a shear rate of zero; it represents the stress required to move the fluid. The YP is expressed in the units of pounds per lb/100 ft². The YP indicates the cuttings carrying capacity of the Invert Emulsion Fluid (IEF) through the annulus, or, in simple terms, the ability of IEF to clean the hole. A YP greater than 15 lb/100 ft$^2$ is considered good for drilling. The PV represents the viscosity of a fluid when extrapolated to infinite shear rate, expressed in units of centipoise (cP). The PV indicates the type and concentration of the solids in the IEF, and a low PV is preferred. Both PV and YP are calculated using 300 revolutions per minute (rpm) and 600-rpm shear rate readings on a standard oilfield viscometer as given in Equations 1 and 2 below.

$$PV = (600 rpm \text{ reading}) - (300 rpm \text{ reading}) \quad \text{(Equation 1)}$$

$$YP = (300 rpm \text{ reading}) - PV \quad \text{(Equation 2)}$$

HPHT Fluid loss is the volume of fluid that seeps out of the formulation when a sample is placed under HPHT condition simulating those of downhole. The HPHT mud cake thickness is a measurement of accumulated solid particle on the filter paper that allows clear fluid to seep out of the formulation. This measurement simulated the accumulation of solid particle of the wall of the wellbore due to the HPHT conditions and the seepage of fluids out of the mud formulation and into the rock formations downhole.

Example 2—Chemical Composition and Properties of Drill-in Fluids Containing a Hygroscopic Chelating Agent Several hygroscopic chelating agents were introduced to the base reservoir drill-in fluid formulation (Example 1), and the changes to the fluid non-damaging properties and the operationally essential properties were tested. The formulations of four reservoir drill-in fluids containing varying concentrations of two different hygroscopic chelating agents (TEPA and E-100) are shown in Table 3.

TABLE 3

The formulations of four reservoir drill-in fluids containing varying concentrations of TEPA or E-100.

| Component | Base Fluid 1 Weight (g) | Fluid 2 Weight (g) | Fluid 3 Weight (g) | Fluid 4 Weight (g) | Fluid 5 Weight (g) |
|---|---|---|---|---|---|
| Water | 219.33 | 219.33 | 219.33 | 219.33 | 219.33 |
| Sodium Formate | 137.4 | 137.4 | 137.4 | 137.4 | 137.4 |
| Potassium Formate | 58.58 | 58.58 | 58.58 | 58.58 | 58.58 |
| Defoamer | 0.01 | 0.01 | 0.01 | 0.01 | 0.01 |
| Premium Starch | 7 | 7 | 7 | 7 | 7 |
| XC polymer | 0.5 | 0.5 | 0.5 | 0.5 | 0.5 |
| Sodium Bicarbonate | 2 | 2 | 2 | 2 | 2 |
| Soda Ash | 3 | 3 | 3 | 3 | 3 |
| Calcium Carbonate fine | 20 | 20 | 20 | 20 | 20 |
| Calcium Carbonate-50 μm | 40 | 40 | 40 | 40 | 40 |
| Chelating Agent | 0 | TEPA = 5 | TEPA = 7 | E100 = 5 | E100 = 7 |

Figure 2:
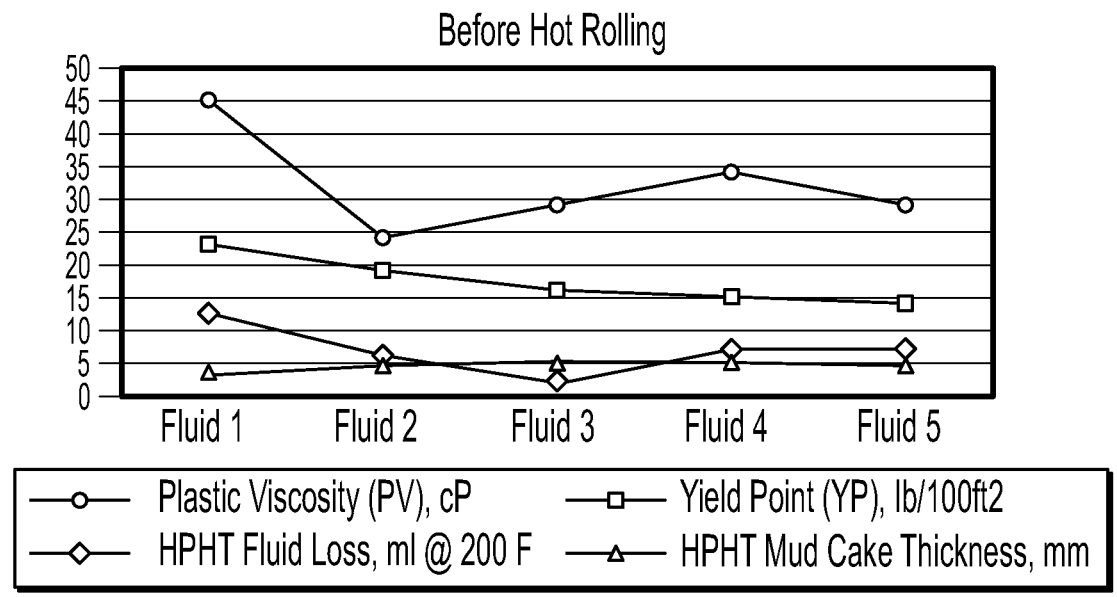
FIG. 2 is a line plot showing rheological properties of each of the exemplified reservoir drill-in fluid formulations before hot rolling.
Figure 3:
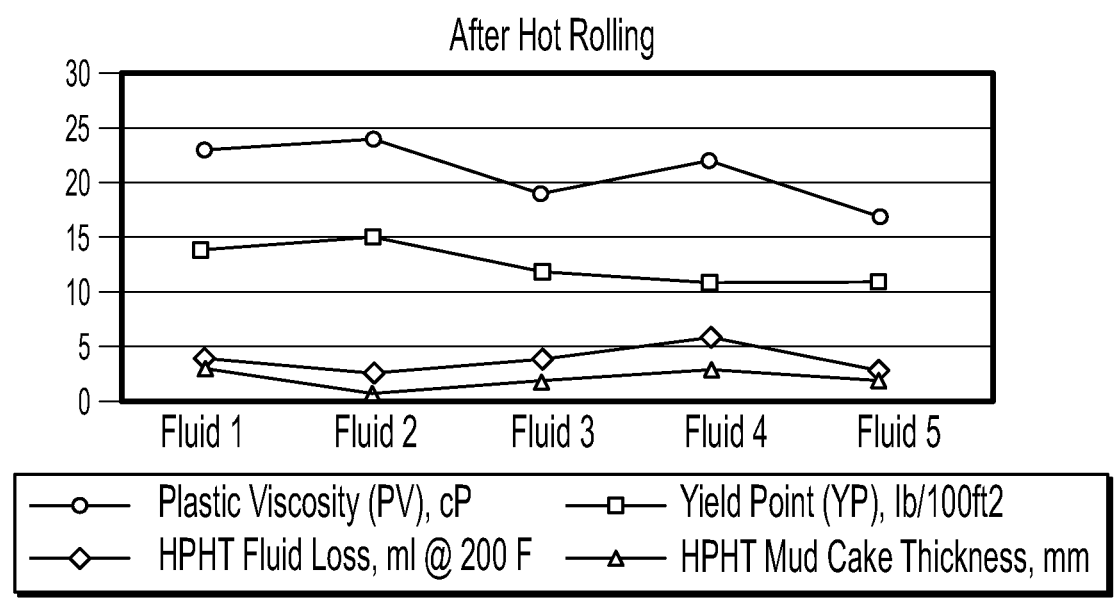
FIG. 3 is a line plot showing rheological properties of each of the exemplified reservoir drill-in fluid formulations after hot rolling.

Table 4 shows a comparison between the rheological properties of each of the five reservoir drill-in fluid formulations before and after hot-rolling aging at 250° F. and 500 psi. This comparison is illustrated in FIG. 2 and FIG. 3.

TABLE 4

Comparison between the rheological properties reservoir drill-in fluid formulations before and after hot rolling

| Parameter | Base Fluid 1 | Fluid 2 | Fluid 3 | Fluid 4 | Fluid 5 |
|---|---|---|---|---|---|
| Before Hot-rolling Aging (BHR) | | | | | |
| pH | 10 | 10.65 | 10.9 | 10.8 | 10.9 |
| Density, pcf | 85 | 85 | 85 | 85 | 85 |
| RPM | Reading | Reading | Reading | Reading | Reading |
| 600 | 113 | 67 | 74 | 83 | 72 |
| 300 | 68 | 43 | 45 | 49 | 43 |
| 200 | 51 | 32 | 35 | 38 | 33 |
| 100 | 32 | 20 | 22 | 24 | 22 |
| 6 | 7 | 5 | 6 | 6 | 6 |
| 3 | 4 | 4 | 4 | 4 | 4 |
| Plastic Viscosity (PV), cP | 45 | 24 | 29 | 34 | 29 |
| Yield Point (YP), lb/100 ft$^2$ | 23 | 19 | 16 | 15 | 14 |
| HPHT Fluid Loss, ml @ 200° F. | 12.5 | 6.1 | 2.2 | 7 | 7.1 |
| HPHT Mudcake Thickness, mm (1/32$^{th}$ inch) | 3.5 (4.4) | 4.5 (5.7) | 5 (6.3) | 5 (6.3) | 4.5 (5.7) |
| After Hot-rolling Aging at 250° F. and 500 psi (AHR) | | | | | |
| pH | 9.85 | 10.85 | 10.85 | 10.65 | 10.85 |
| Density, pcf | 85 | 84 | 85 | 85 | 85 |
| RPM | Reading | Reading | Reading | Reading | Reading |
| 600 | 60 | 63 | 50 | 55 | 45 |
| 300 | 37 | 39 | 31 | 33 | 28 |

TABLE 4-continued

Comparison between the rheological properties reservoir drill-in fluid formulations before and after hot rolling

| Parameter | Base Fluid 1 | Fluid 2 | Fluid 3 | Fluid 4 | Fluid 5 |
|---|---|---|---|---|---|
| 200 | 28 | 29 | 24 | 26 | 21 |
| 100 | 17 | 18 | 15 | 17 | 14 |
| 6 | 3 | 3 | 2.5 | 4 | 3 |
| 3 | 2 | 2 | 1 | 2 | 2 |
| Plastic Viscosity (PV), cP | 23 | 24 | 19 | 22 | 17 |
| Yield Point (YP), lb/100 ft$^2$ | 14 | 15 | 12 | 11 | 11 |
| HPHT Fluid Loss, ml at 200° F. | 4.1 | 2.7 | 4 | 6 | 3 |
| HPHT Mudcake Thickness, mm (1/32$^{th}$ inch) | 3 (3.78) | 1 (1.26) | 2 (2.52) | 3 (3.78) | 2 (2.52) |

These results show that adding a hygroscopic chelating agent to the drill-in fluid lead to a decrease in the HPHT filtration volume and a reduction in damaging solids, as illustrated by the reduced mudcake thickness. See, for example, Fluid 2 where TEPA was used at a concentration of 5 barrels oil per day unit number (lb/bbl). Before hot rolling (BHR), the decrease in filtration volume due to the introduction of the hygroscopic chelating agent falls in the range of +43% to +82%. At the same time, the mudcake thickness was marginally increased. After hot-rolling (AHR), the percentage drop in filtration volume due to the introduction of the hygroscopic chelating agent falls in the range of −46% to +34%. After hot rolling, the mudcake thickness decreased by a range of +33% to +66%. The contrast between the increase of mudcake thickness BHR and the decrease of mudcake thickness AHR indicate that the exposure to elevated temperature and the passage of time during the hot-rolling aging process led to a chelation reaction that reduced the mudcake thickness.

The test results shown in Example 2 demonstrate that operational properties of a drill-in fluid, such as density, viscosity, yield point, and pH, were not jeopardized by the addition of the hygroscopic chelating agent. Finally, all exemplified formulations were tested using the particle plugging apparatus (PPA). The test of the formation using PPA is conducted to evaluate the ability of drill-in fluids to minimize formation damage. The base fluid along with the four fluids containing the hygroscopic chelating agent described in Example 2 passed the PPA test successfully The PPA test is used to determine the ability of particles in the drilling fluid to effectively bridge the pores in the filter medium and, therefore, the ability of the mud to reduce formation damage in the reservoir. The PPA resembles a high-pressure, high-temperature filtration cell that has been modified to operate upside-down to remove the effects of gravity and to accept filter media having different permeabilities. For example, the filter media can include a sintered metal chosen for higher temperature conditions, and aloxite, which is an example porous ceramic material, or rock. The filter medium is selected to match the permeability of the reservoir to be drilled. The filter medium is at the top so that sediment will not affect the filter cake. Pressure is applied hydraulically at a location downhole of the filter medium. When a reservoir drill-in sample is placed in the cell, it will be subjected to HPHT conditions similar to those of a downhole environment. The sample passes the test successfully if it bridges the pores in the filter medium and prevent any seepage through it for the full duration of the test.

Example 3—Exemplary Weight Ranges of Components in the Drill-in Fluid

Table 5 shows distribution of components in a low density fluid (low mud weight, left column) and a high density fluid (high mud weight, middle column). The distribution of components in the base fluid (85 pcf) is shown in Table 1 (Example 1).

TABLE 5

Chemical composition of low and high weight muds

| Additive | Starting Weight Range Limit (g) | Final Weight Range Limit (g) |
|---|---|---|
| Water | 340 | 10 |
| Sodium Formate | 5 | 600 |
| Potassium Formate | 5 | 470 |
| Defoamer | 0.01 | 0.05 |
| Premium Starch | 2 | 20 |
| XC polymer | 0.1 | 10 |
| Sodium Bicarbonate | 0.5 | 5 |
| Soda Ash | 0.5 | 10 |
| Calcium Carbonate fine | 1 | 100 |
| Calcium Carbonate-50 μm | 1 | 100 |
| Chelating Agent | 0.5 | 20 |
| Total drilling Fluid Density (Mud Weight) Limits, lb/ft$^3$ | 67 | 120 |

Example 4—Comparative Example

Example 4 shows change in properties (filtrate volume, mudcake thickness) of drilling fluids of Example 2, when compared to the base drill-in fluid of Example 1. Table 6 shows percent change in the indicated property. Negative values indicate an increase in the parameter's value and positive values indicate a decrease in the parameter's value when compared to the base fluid.

TABLE 6

Relative properties of fluids 2-5 when compared to fluid 1.

| Drilling Fluid Parameter | Fluid 1 | Fluid 2 | Fluid 3 | Fluid 4 | Fluid 5 |
|---|---|---|---|---|---|
| Change in filtration BHR, % | 0.00 | 51.20 | 82.40 | 44.00 | 43.20 |
| Change in cake thickness BHR, % | 0.00 | −28.57 | −42.86 | −42.86 | −28.57 |
| Change in filtration AHR, % | 0.00 | 34.15 | 2.44 | −46.34 | 26.83 |
| Change in cake thickness AHR, % | 0.00 | 66.67 | 33.33 | 0.00 | 33.33 |
| Change in Plastic Viscosity BHR, % | 0.00 | 46.67 | 35.56 | 24.44 | 35.56 |
| Change in Yield Point BHR, % | 0.00 | 17.39 | 30.43 | 34.78 | 39.13 |

TABLE 6-continued

Relative properties of fluids 2-5 when compared to fluid 1.

| Drilling Fluid Parameter | Fluid 1 | Fluid 2 | Fluid 3 | Fluid 4 | Fluid 5 |
|---|---|---|---|---|---|
| Change in Plastic Viscosity AHR, % | 0.00 | −4.35 | 17.39 | 4.35 | 26.09 |
| Change in Yield Point AHR, % | 0.00 | −7.14 | 14.29 | 21.43 | 21.43 |

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A drill-in slurry comprising:
   (a) an aqueous base fluid;
   (b) a solid particulate material comprising a metal salt, a metal oxide, or a metal hydroxide in an amount of about 5 wt. % to about 25 wt. %; and
   (c) a hygroscopic chelating agent in a range of about 0.5 wt. % to about 5 wt. %;
   wherein the chelating agent binds to at least one particle of the solid particulate material;
   wherein the plastic viscosity of the drill-in slurry under standard conditions of about 20° C. and 101 kilopascal (kPa) is about 10 centipoise (cP) to about 75 cP and under harsh conditions of about 121° C. and about 3447 kPa is about 5 cP to about 50 cP; and
   wherein the drill-in slurry is adapted for drilling through a reservoir section of a subterranean formation.

2. The drill-in slurry of claim 1, wherein the solid particulate material comprises calcium carbonate.

3. The drill-in slurry of claim 1, wherein the hygroscopic chelating agent comprises a polyamine.

4. The drill-in slurry of claim 3, wherein the hygroscopic chelating agent comprises at least one compound of Formula (I):

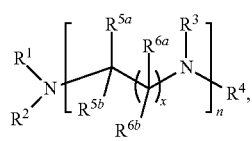

(I)

or a salt thereof, wherein:
R$^1$, R$^2$ and R$^4$ are independently selected from the group consisting of H, C$_{1-6}$ alkyl, C$_{2-6}$ alkenyl, C$_{2-6}$ alkynyl, Cy$^1$, C(O)R$^b$, C(O)NR$^c$R$^d$, C(O)OR$^a$, S(O)$_2$R$^b$, S(O)$_2$NR$^c$R$^d$; wherein the C$_{1-6}$ alkyl, C$_{2-6}$ alkenyl and C$_{2-6}$ alkynyl are each optionally substituted with 1, 2, 3, or 4 substituents independently selected from the group consisting of halo, Cy$^2$, CN, NO$_2$, OR$^{a1}$, SR$^{a1}$, C(O)R$^{b1}$, C(O)NR$^{c1}$R$^{d1}$, C(O)OR$^{a1}$, OC(O)R$^{b1}$, OC(O)NR$^{c1}$R$^{d1}$, NR$^{c1}$R$^{d1}$, NR$^{c1}$C(O)R$^{b1}$, NR$^{c1}$C(O)OR$^{b1}$, NR$^{c1}$C(O)NR$^{c1}$R$^{d1}$, NR$^{c1}$S(O)$_2$R$^{b1}$, NR$^{c1}$S(O)$_2$NR$^{c1}$R$^{d1}$, S(O)$_2$R$^{b1}$, and S(O)$_2$NR$^{c1}$R$^{d1}$;
each R$^3$, R$^{5a}$, R$^{5b}$, R$^{6a}$ and R$^{6b}$ is independently selected from the group consisting of H, C$_{1-6}$ alkyl, C$_{2-6}$ alkenyl, C$_{2-6}$ alkynyl, Cy$^1$, C(O)R$^b$, C(O)NR$^c$R$^d$, C(O)OR$^a$, S(O)$_2$R$^b$, S(O)$_2$NR$^c$R$^d$ and a group of formula (i):

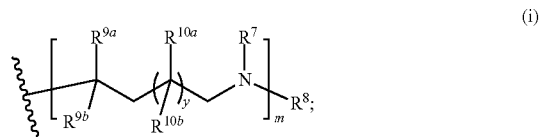

(i)

wherein the C$_{1-6}$ alkyl, C$_{2-6}$ alkenyl and C$_{2-6}$ alkynyl are each optionally substituted with 1, 2, 3, or 4 substituents independently selected from the group consisting of halo, Cy$^2$, CN, NO$_2$, OR$^{a1}$, SR$^{a1}$, C(O)R$^{b1}$, C(O)NR$^{c1}$R$^{d1}$, C(O)OR$^{a1}$, OC(O)R$^{b1}$, OC(O)NR$^{c1}$R$^{d1}$, NR$^{C1}$R$^{d1}$, NR$^{c1}$C(O)R$^{b1}$, NR$^{c1}$C(O)OR$^{b1}$, NR$^{c1}$C(O)NR$^{c1}$R$^{d1}$, NR$^{c1}$S(O)$_2$R$^{b1}$, NR$^{c1}$S(O)$_2$NR$^{c1}$R$^{d1}$, S(O)$_2$R$^{b1}$, and S(O)$_2$NR$^{c1}$R$^{d1}$;
or alternatively, when x is 1, 2, or 3, any two R$^3$ and R$^{5a}$ groups together with the carbon atom to which R$^{5a}$ is attached, the carbon atom to which R$^{6a}$ and R$^{6b}$ are attached and the nitrogen atom to which R$^3$ is attached form a 5-10 membered heterocycloalkyl, which is optionally substituted with 1, 2, or 3 independently selected R$^g$ substituents;
or alternatively, when n is an integer between 2 and 100, any two adjacent R$^3$ groups together with the nitrogen atoms to which they are attached, the carbon atom to which R$^{5a}$ and R$^{5b}$ are attached and the carbon atom to which R$^{6a}$ and R$^{6b}$ are attached form a 5-10 membered heterocycloalkyl, which is optionally substituted with 1, 2, or 3 independently selected R$^g$ substituents;
each R$^7$, R$^8$, R$^{9a}$, R$^{9b}$, R$^{10a}$ and R$^{10b}$ is independently selected from the group consisting of H, C$_{1-6}$ alkyl, C$_{2-6}$ alkenyl, C$_{2-6}$ alkynyl, Cy$^1$, C(O)R$^b$, C(O)NR$^c$R$^d$, C(O)OR$^a$, S(O)$_2$R$^b$, S(O)$_2$NR$^c$R$^d$; wherein the C$_{1-6}$ alkyl, C$_{2-6}$ alkenyl and C$_{2-6}$ alkynyl are each optionally substituted with 1, 2, 3, or 4 substituents independently selected from the group consisting of halo, Cy$^2$, CN, NO$_2$, OR$^{a1}$, SR$^{a1}$, C(O)R$^{b1}$, C(O)NR$^{c1}$R$^{d1}$, C(O)OR$^{a1}$, OC(O)R$^{b1}$, OC(O)NR$^{c1}$R$^{d1}$, NR$^{c1}$R$^{d1}$, NR$^{c1}$C(O)R$^{b1}$, NR$^{c1}$C(O)OR$^{b1}$NR$^{c1}$C(O)NR$^{c1}$R$^{d1}$, NR$^{c1}$S(O)$_2$R$^{b1}$, NR$^{c1}$S(O)$_2$NR$^{c1}$R$^{d1}$, S(O)$_2$R$^{b1}$, and S(O)$_2$NR$^{c1}$R$^{d1}$;
or alternatively, when y is 1, 2, or 3, any two R$^7$ and R$^{9a}$ groups together with the carbon atom to which R$^{9a}$ is attached, the carbon atom to which R$^{10a}$ and R$^{10b}$ are attached and the nitrogen atom to which R$^7$ is attached form a 5-10 membered heterocycloalkyl, which is optionally substituted with 1, 2, or 3 independently selected R$^g$ substituents;
or alternatively, when m is an integer between 2 and 100, any two adjacent R$^7$ groups together with the nitrogen atoms to which they are attached, the carbon atom to which R$^{9a}$ and R$^{9b}$ are attached and the carbon atom to which R$^{10a}$ and R$^{10b}$ are attached form a 5-10 membered heterocycloalkyl, which is optionally substituted with 1, 2, or 3 independently selected R$^g$ substituents;
each n and m is independently an integer between 1 and 100;
each x and y is independently an integer between 0 and 10;
each Cy$^1$ and Cy$^2$ is independently selected from the group consisting of C$_{3-7}$ cycloalkyl, 4-7 membered heterocycloalkyl, 6-12 membered aryl, and 5-14 membered heteroaryl, each of which is optionally substituted with 1, 2, 3, or 4 substituents independently selected from $R^{Cy}$;

each $R^{Cy}$ is independently selected from the group consisting of $C_{1-6}$ alkyl, $C_{2-6}$ alkenyl, $C_{2-6}$ alkynyl, halo, CN, $OR^{a2}$, $SR^{a2}$, $C(O)R^{b2}$, $C(O)NR^{c2}R^{d2}$, $C(O)OR^{a2}$, $OC(O)R^{b2}$, $OC(O)NR^{c2}R^{d2}$, $NR^{c2}R^{d2}$, $NR^{c2}C(O)R^{b2}$, $NR^{c2}C(O)OR^{a2}$, $NR^{c2}C(O)NR^{c2}R^{d2}$, $NR^{c2}S(O)R^{b2}$, $NR^{c2}S(O)_2R^{b2}$, $NR^{c2}S(O)_2NR^{c2}R^{d2}$, $S(O)_2R^{b2}$, and $S(O)_2NR^{c2}R^{d2}$; wherein the $C_{1-6}$ alkyl, $C_{2-6}$ alkenyl, and $C_{2-6}$ alkynyl are each optionally substituted with 1, 2, or 3 substituents independently selected from halo, CN, $OR^{a3}$, $SR^{a3}$, $C(O)R^{b3}$, $C(O)NR^{c3}R^{d3}$, $C(O)OR^{a3}$, $OC(O)R^{b3}$, $OC(O)NR^{c3}R^{d3}$, $NR^{c3}R^{d3}$, $NR^{c3}C(O)R^{b3}$, $NR^{c3}C(O)OR^{a3}$, $NR^{c3}C(O)NR^{c3}R^{d3}$, $NR^{c3}S(O)_2R^{b3}$, $NR^{c3}S(O)_2NR^{c3}R^{d3}$, $S(O)_2R^{b3}$, and $S(O)_2NR^{c3}R^{d3}$;

each $R^a$, $R^b$, $R^c$, $R^d$, $R^{a1}$, $R^{b1}$, $R^{c1}$, $R^{d1}$, $R^{a2}$, $R^{b2}$, $R^{c2}$, $R^{d2}$, $R^{a3}$, $R^{b3}$, $R^{c3}$, and $R^{d3}$ is independently selected from H, $C_{1-6}$ alkyl, $C_{2-6}$ alkenyl, $C_{2-6}$ alkynyl, $C_{3-7}$ cycloalkyl, 4-7 membered heterocycloalkyl, 6-12 membered aryl, and 5-14 membered heteroaryl; wherein each $C_{1-6}$ alkyl, $C_{2-6}$ alkenyl, $C_{2-6}$ alkynyl, $C_{3-7}$ cycloalkyl, 4-7 membered heterocycloalkyl, 6-12 membered aryl, and 5-14 membered heteroaryl is optionally substituted with 1, 2, or 3 independently selected substituents $R^g$;

or alternatively, any $R^c$ and $R^d$ attached to the same N atom, any $R^{c1}$ and $R^{d1}$ attached to the same N atom, any $R^{c2}$ and $R^{d2}$ attached to the same N atom, and any $R^{c3}$ and $R^{d3}$ attached to the same N atom, together with the with the N atom to which they are attached, form a 4-6 membered heterocycloalkyl group or a 5-6 membered heteroaryl group, each optionally substituted with 1, 2, or 3 independently selected $R^g$ groups;

each $R^g$ is independently selected from the group consisting of OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano—$C_{1-3}$ alkyl, HO—$C_{1-3}$ alkyl, amino, $C_{1-6}$ alkylamino, di($C_{1-6}$alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{h6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

5. The drill-in slurry of claim 4, wherein n is an integer between 1 and 20.

6. The drill-in slurry of claim 5, wherein each of $R^1$, $R^2$, $R^4$, $R^{5a}$, $R^{5b}$, $R^{6a}$ and $R^{6b}$ is independently selected from the group consisting of H and $C_{1-3}$ alkyl.

7. The drill-in slurry of claim 4, wherein n is an integer between 2 and 20, and at least at one occurrence any two adjacent $R^3$ groups together with the nitrogen atoms to which they are attached, the carbon atom to which $R^{5a}$ and $R^{5b}$ are attached and the carbon atom to which $R^{6a}$ and $R^{6b}$ are attached form a 5-10 membered heterocycloalkyl, which is optionally substituted with 1, 2, or 3 independently selected $R^g$ substituents.

8. The drill-in slurry of claim 6, wherein each $R^3$ is selected from the group consisting of H, $C_{1-6}$ alkyl and a moiety of formula (i):

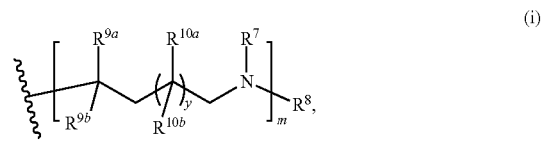

wherein each $R^8$, $R^{9a}$, $R^{9b}$, $R^{10a}$ and $R^{10b}$ is independently selected from the group consisting of H and $C_{1-3}$ alkyl; and each $R^7$ is selected from the group consisting of H and $C_{1-6}$ alkyl;

wherein the $C_{1-6}$ alkyl is optionally substituted with 1 or 2 amino groups.

9. The drill-in slurry of claim 6, wherein $R^3$ is selected from the group consisting of H, $CH_3$ and a moiety of formula (i-a):

wherein m is an integer between 1 and 5.

10. The drill-in slurry of claim 5, wherein the compound of Formula (I) is selected from the group consisting of:

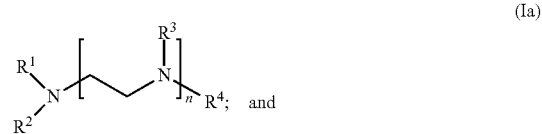

11. The drill-in slurry of claim 1, wherein the hygroscopic chelating agent is selected from the group consisting of:

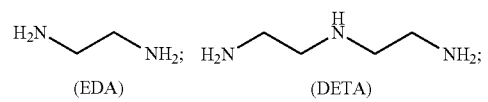

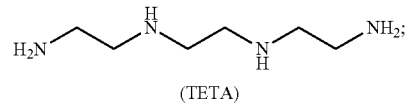

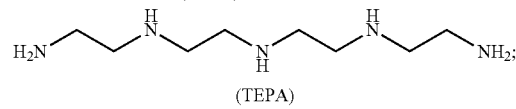

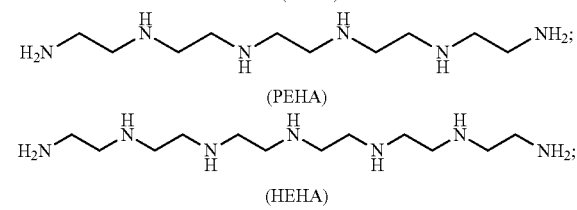

-continued

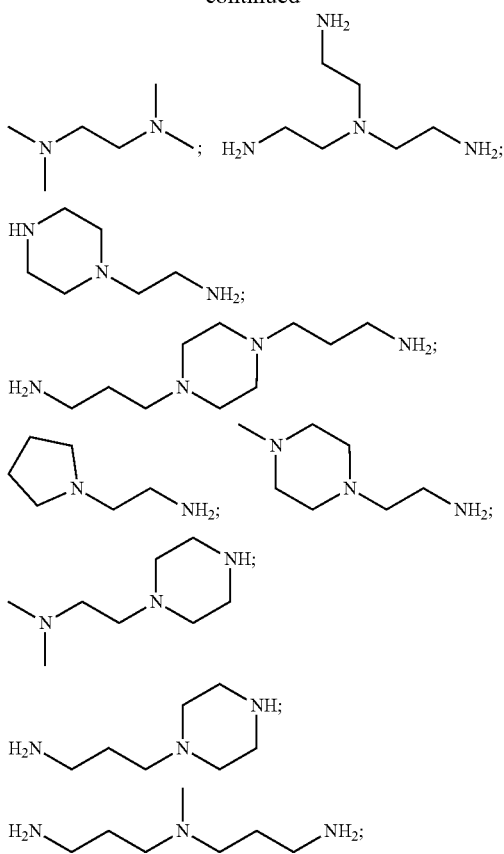

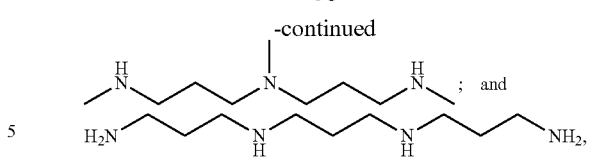

or a mixture thereof.

12. The drill-in slurry claim 1, wherein an amount of the hygroscopic chelating agent in the drill-in slurry is in a range of about 1 wt. % to about 4 wt. %.

13. The drill-in slurry of claim 12, wherein the amount of the hygroscopic chelating agent in the drill-in slurry is in a range of about 1 wt. % to about 2 wt. %.

14. The drill-in slurry of claim 1, comprising at least one alkali formate.

15. The drill-in slurry of claim 14, wherein an amount of the at least one alkali formate in the drill-in slurry is from about 20 wt. % to about 60 wt. %.

16. The drill-in slurry of claim 1, comprising an additional ingredient selected from the group consisting of a defoamer, a viscosity modifier, a stabilizer, soda ash, sodium bicarbonate, or a combination thereof.

17. The drill-in slurry of claim 1, wherein the pH of the drill-in slurry is in the range of about 9 to about 11, the density of the drill-in slurry is in a range of about 50 pcf to about 150 pcf, and the plastic viscosity of the drill-in slurry is in a range of about 5 to about 50 cP.

18. The drill-in slurry of claim 1, wherein the plastic viscosity of the slurry under standard conditions is about 20 cP to about 50 cP.

19. The drill-in slurry of claim 1, wherein the plastic viscosity of the slurry under harsh conditions is about 10 cP to about 30 cP.

* * * * *

UNITED STATES PATENT AND TRADEMARK OFFICE
CERTIFICATE OF CORRECTION

PATENT NO. : 10,982,124 B2
APPLICATION NO. : 15/804763
DATED : April 20, 2021
INVENTOR(S) : AlBahrani et al.

It is certified that error appears in the above-identified patent and that said Letters Patent is hereby corrected as shown below:

In the Claims

Column 36, Lines 5-10, Claim 4, delete " 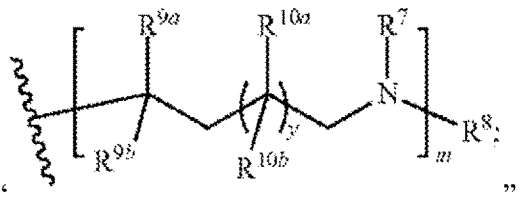 "

and insert -- 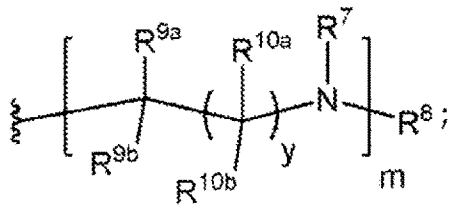 --;

Column 36, Line 17, Claim 4, delete "$NR^{C1}R^{d1}$," and insert -- $NR^{c1}R^{d1}$, --;

Column 36, Line 44, Claim 4, delete "$NR^{c1}C(O)OR^{b1}NR^{c1}C(O)NR^{c1}R^{d1}$," and insert -- $NR^{c1}C(O)OR^{b1}$, $NR^{c1}C(O)NR^{c1}R^{d1}$, --;

Column 37, Lines 31-32, Claim 4, delete "with the with the" and insert -- with the --;

Column 37, Line 41, Claim 4, delete "$di(C_{1-6}alkyl)amino$," and insert -- $di(C_{1-6}\ alkyl)amino$, --;

Column 37, Line 47, Claim 4, delete "$di(C_{h6}$" and insert -- $di(C_{1-6}$ --;

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,982,124 B2

Column 38, Lines 5-11, Claim 8, delete " 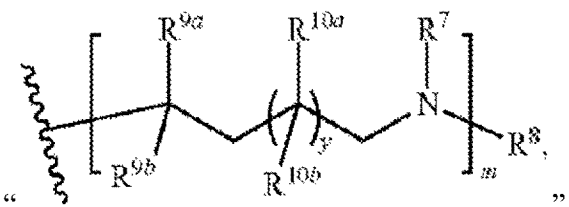 "

and insert -- 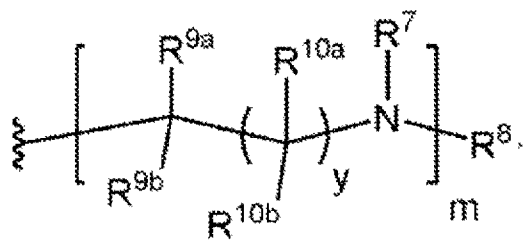 --; and

Column 40, Line 9, Claim 12, after "slurry" insert -- of --.